(12) United States Patent  
Matsumoto et al.

(10) Patent No.: US 10,909,384 B2  
(45) Date of Patent: Feb. 2, 2021

(54) MONITORING SYSTEM AND MONITORING METHOD

(71) Applicant: Panasonic Intellectual Property Management Co., Ltd., Osaka (JP)

(72) Inventors: Hiroyuki Matsumoto, Fukuoka (JP); Toshimichi Tokuda, Fukuoka (JP); Shintaro Yoshikuni, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 264 days.

(21) Appl. No.: 15/182,488

(22) Filed: Jun. 14, 2016

(65) Prior Publication Data

US 2017/0019744 A1   Jan. 19, 2017

(30) Foreign Application Priority Data

Jul. 14, 2015 (JP) .................................. 2015-140863  
Jul. 23, 2015 (JP) .................................. 2015-145857

(51) Int. Cl.
*G09G 5/14* (2006.01)  
*G06K 9/00* (2006.01)  
(Continued)

(52) U.S. Cl.
CPC ......... *G06K 9/00771* (2013.01); *G06K 9/209* (2013.01); *H04R 3/005* (2013.01);  
(Continued)

(58) Field of Classification Search
CPC ...................................................... G09G 5/14  
(Continued)

(56) References Cited

U.S. PATENT DOCUMENTS 4,264,927 A * 4/1981 Raymond ............. B61L 25/041  
                                                     348/148  
5,790,181 A   8/1998 Chahl et al.  
(Continued)

FOREIGN PATENT DOCUMENTS

CN        1968405 A      5/2007  
CN      101086741 A     12/2007  
(Continued)

OTHER PUBLICATIONS

Busset et al., "Detection and tracking of drones using advanced acoustic cameras," Proc. of SPIE vol. 9647 96470F-1, 2015, 8 pages.

(Continued)

*Primary Examiner* — Jefferey F Harold  
*Assistant Examiner* — Sihar A Karwan  
(74) *Attorney, Agent, or Firm* — Seed IP Law Group LLP

(57) ABSTRACT

In a sound source display system, an omnidirectional camera captures an image of a monitoring area. A microphone array collects a voice in the monitoring area. A monitoring monitor displays the image of an imaging area captured by the omnidirectional camera. A sound pressure calculator in a directivity control device calculates a sound pressure indicating a source of a sound in the image of the imaging area using voice data of the voice collected by the microphone array. An output controller in the directivity control device compares the sound pressure and threshold values (first threshold value, second threshold value), and causes sound image information in which the sound pressure is converted into visual information according to the result of comparison, to be displayed on the monitoring monitor so as to be superimposed on the image of the imaging area.

16 Claims, 14 Drawing Sheets

(51) Int. Cl.
*H04R 3/00* (2006.01)
*G06K 9/20* (2006.01)
*H04R 29/00* (2006.01)
*H04R 19/04* (2006.01)
*H04R 1/02* (2006.01)
*H04R 1/40* (2006.01)

(52) U.S. Cl.
CPC ............. *H04R 29/008* (2013.01); *H04R 1/02* (2013.01); *H04R 1/406* (2013.01); *H04R 19/04* (2013.01); *H04R 2201/401* (2013.01); *H04R 2430/23* (2013.01)

(58) Field of Classification Search
USPC ........................................................ 345/634
See application file for complete search history.

(56) References Cited

U.S. PATENT DOCUMENTS

| | | | |
|---|---|---|---|
| 6,043,837 | A | 3/2000 | Driscoll, Jr. et al. |
| 6,157,403 | A | 12/2000 | Nagata |
| 7,002,617 | B1 | 2/2006 | Smith |
| 7,162,043 | B2 * | 1/2007 | Sugiyama ................ G01H 3/00 367/125 |
| 7,260,241 | B2 | 8/2007 | Fukuhara et al. |
| 7,298,930 | B1 | 11/2007 | Erol et al. |
| 7,536,029 | B2 | 5/2009 | Choi et al. |
| 7,893,985 | B1 | 2/2011 | Ahiska et al. |
| 8,427,538 | B2 | 4/2013 | Ahiska |
| 8,547,416 | B2 | 10/2013 | Ozawa |
| 9,036,001 | B2 | 5/2015 | Chuang et al. |
| 9,098,910 | B2 | 8/2015 | Hinkel |
| 9,407,851 | B2 | 8/2016 | Kweon |
| 2001/0010555 | A1 | 8/2001 | Driscoll, Jr. |
| 2002/0075295 | A1 | 6/2002 | Stentz et al. |
| 2003/0160862 | A1 | 8/2003 | Charlier et al. |
| 2003/0160868 | A1 | 8/2003 | Kakou et al. |
| 2005/0140810 | A1 | 6/2005 | Ozawa |
| 2006/0122841 | A1 | 6/2006 | Shin et al. |
| 2007/0070190 | A1 | 3/2007 | Yin et al. |
| 2008/0010060 | A1 | 1/2008 | Asano et al. |
| 2008/0131092 | A1 | 6/2008 | Takanezawa |
| 2009/0041378 | A1 | 2/2009 | Yamaoka et al. |
| 2009/0185028 | A1 | 7/2009 | Ogawa |
| 2010/0123785 | A1 | 5/2010 | Chen et al. |
| 2010/0185308 | A1 | 7/2010 | Yoshida et al. |
| 2011/0013075 | A1 | 1/2011 | Kim et al. |
| 2011/0243543 | A1 | 10/2011 | Pace et al. |
| 2012/0045149 | A1 | 2/2012 | Arai et al. |
| 2012/0093339 | A1 * | 4/2012 | Wu ........................ G01S 3/8083 381/92 |
| 2012/0124603 | A1 | 5/2012 | Amada |
| 2012/0162259 | A1 * | 6/2012 | Sakai .................... G02B 27/017 345/634 |
| 2012/0169842 | A1 | 7/2012 | Chuang et al. |
| 2012/0218377 | A1 | 8/2012 | Oku |
| 2012/0317594 | A1 | 12/2012 | Thorn et al. |
| 2013/0321568 | A1 | 12/2013 | Suzuki et al. |
| 2014/0085538 | A1 | 3/2014 | Kaine et al. |
| 2014/0340513 | A1 | 11/2014 | Nagata et al. |
| 2014/0376740 | A1 | 12/2014 | Shigenaga et al. |
| 2015/0016641 | A1 | 1/2015 | Ugur et al. |
| 2015/0095818 | A1 * | 4/2015 | Lee ........................ G06F 3/0488 715/765 |
| 2015/0350621 | A1 | 12/2015 | Sawa et al. |
| 2016/0065820 | A1 | 3/2016 | Yamamoto et al. |
| 2016/0142620 | A1 * | 5/2016 | Sawa ........................ H04S 7/00 348/143 |
| 2016/0277863 | A1 | 9/2016 | Cahill et al. |
| 2017/0132474 | A1 * | 5/2017 | Matsumoto ........ H04N 5/23296 |

FOREIGN PATENT DOCUMENTS

| | | |
|---|---|---|
| JP | 8-7199 A | 1/1996 |
| JP | 9-101197 A | 4/1997 |
| JP | 10-51889 A | 2/1998 |
| JP | 11-146295 A | 5/1999 |
| JP | 11-205772 A | 7/1999 |
| JP | 11-331827 A | 11/1999 |
| JP | 2000-196941 A | 7/2000 |
| JP | 2000-209689 A | 7/2000 |
| JP | 2003-008974 A | 1/2003 |
| JP | 2003-18561 A | 1/2003 |
| JP | 2003-189273 A | 7/2003 |
| JP | 2004-77277 A | 3/2004 |
| JP | 2004-180197 A | 6/2004 |
| JP | 2005-274707 A | 10/2005 |
| JP | 2006-003941 A | 1/2006 |
| JP | 2006-168421 A | 6/2006 |
| JP | 2006-174216 A | 6/2006 |
| JP | 2007-295335 A | 11/2007 |
| JP | 2007-300220 A | 11/2007 |
| JP | 2008-141703 A | 6/2008 |
| JP | 2008-193196 A | 8/2008 |
| JP | 2008-271157 A | 11/2008 |
| JP | 2009-118318 A | 5/2009 |
| JP | 2009-296232 A | 12/2009 |
| JP | 2010-26834 A | 2/2010 |
| JP | 2010-103773 A | 5/2010 |
| JP | 2010-187363 A | 8/2010 |
| JP | 2010-213091 A | 9/2010 |
| JP | 2010-232888 A | 10/2010 |
| JP | 2011-71686 A | 4/2011 |
| JP | 2011-188016 A | 9/2011 |
| JP | 2011-211675 A | 10/2011 |
| JP | 2012-105199 A | 5/2012 |
| JP | 2012-129873 A | 7/2012 |
| JP | 2012-133250 A | 7/2012 |
| JP | 2013-015468 A | 1/2013 |
| JP | 2013-106298 A | 5/2013 |
| JP | 2013-240000 A | 11/2013 |
| JP | 2014-137323 A | 7/2014 |
| JP | 2014-143678 A | 8/2014 |
| JP | 2014-212443 A | 11/2014 |
| JP | 2015-29241 A | 2/2015 |
| JP | 5939341 B1 | 6/2016 |
| JP | 5979458 B1 | 8/2016 |
| JP | 2017-92938 A | 5/2017 |
| WO | 2011/114610 A1 | 9/2011 |
| WO | 2014/125835 A1 | 8/2014 |
| WO | 2015/162645 A1 | 10/2015 |

OTHER PUBLICATIONS

Case et al., "Low-Cost Acoustic Array for Small UAV Detection and Tracking," Wright State University, Dayton, Ohio, IEEE 2008, pp. 110-113. (4 pages).
Chinese Office Action and English translation of Chinese Search Report, dated Jun. 1, 2017, for Chinese Application No. 201380068876.3, 7 pages.
English translation of Chinese Search Report and Office Action, dated Dec. 31, 2019, for Chinese Application No. 201680062295.2, 26 pages.
Extended European Search Report, dated Sep. 23, 2015, for European Application No. 13868107.7-1902, 8 pages.
International Search Report and Written Opinion, dated Apr. 1, 2014, for International Application No. PCT/JP2013/007681, 9 pages.
International Search Report and Written Opinion, dated May 29, 2017, for International Application No. PCT/JP2017/005872, 16 pages.
International Search Report, dated Mar. 16, 2017, for International Application No. PCT/JP2016/004793, 6 pages.
Japanese Office Action, dated Jan. 19, 2016, for Japanese Application No. 2015-007242, 6 pages. (With English translation).
Japanese Office Action, dated Jul. 5, 2016, for Japanese Application No. 2013-252468, 8 pages. (With English translation).
Kloow, "Acoustic eraser used with the acoustic camera on disturbing sources," Joint Baltic-Nordic Acoustics Meeting, Jun. 18-20, 2012, Odense, Denmark, 7 pages.

(56) References Cited

OTHER PUBLICATIONS

O'Donovan et al., "Imaging Concert Hall Acoustics Using Visual and Audio Cameras," Perceptual Interfaces & Reality Lab, Computer Science & UMIACS, University of Maryland, College Park, IEEE 2008, pp. 5284-5287. (4 pages).

* cited by examiner

MONITORING SYSTEM AND MONITORING METHOD

BACKGROUND

1. Technical Field

The present disclosure relates to a monitoring system and a monitoring method that display an image indicating a sound source.

2. Description of the Related Art

In recent years, in a surveillance system as an example of a monitoring system, monitoring a fixed monitoring target area is performed using voice data collected by a microphone in addition to video data captured by a monitor camera. In this surveillance system, the monitor microphone and the monitor camera are installed in a location separate from a location of a monitor device on which the video data captured by the monitor camera is displayed. By performing the monitoring using the voice data in addition to the video data, in a case of any incident or trouble, a background of the incident or the trouble can be clarified by the voice data in the vicinity of a sound source (that is, origin of the incident or the trouble) appearing in the video data.

In addition, as a head mounted display mounting a microphone and is mounted on a head, a head mounted display is known, in which collected sound information is displayed so as to be superimposed on the visual video data. For example, such technologies are disclosed in Japanese Patent Unexamined Publication No. 2012-133250. The head mounted display displays a sound source position on the visual video data and a level of the sound output from the sound source is displayed by a size of a circle and a frequency of the sound output from the sound source is displayed by a color of the circle.

However, in the literature described above, the disclosed configuration is not assumed to be applied to a surveillance system. In other words, in the surveillance system, the sound information of the voice data collected by the monitor microphone is not displayed on the monitor device which displays the video data captured by the monitor camera. Therefore, in the surveillance system in the related art, even if a user views the video image displayed on the monitor device, for example, it is not possible to easily and visually recognize the sound source generating the abnormal sound.

SUMMARY

An object of the present disclosure is to provide a monitoring system and a monitoring method that display a sound source appearing on video data obtained by imaging a monitoring target area as visual image information, and improve the efficiency of a monitoring business.

The present disclosure provides a sound source display system including: an omnidirectional camera that images an imaging area; a microphone array that collects a voice in the imaging area; a display that displays image data of the imaging area imaged by the omnidirectional camera; and a signal processor that derives a sound parameter relating to a sound source appearing in image data of the imaging area using voice data collected by the microphone array. The signal processor causes sound source image information in which the sound parameter relating to the sound source is converted into visual information according to the comparison between the derived sound parameter relating to the sound source and a threshold value, to be displayed on the display so as to be superimposed on the image data of the imaging area.

In addition, the present disclosure provides a sound source display method in a sound source display system including an omnidirectional camera and a microphone array. The method includes: imaging an imaging area using the omnidirectional camera; collecting a voice in the imaging area using the microphone array; deriving a sound parameter relating to the sound source appearing in the image data of the imaging area using the voice data collected by the microphone array; and causing sound source image information in which the sound parameter relating to the sound source is converted into visual information according to the comparison between the derived sound parameter relating to the sound source and a threshold value, to be displayed on the display so as to be superimposed on the image data of the imaging area.

According to the present disclosure, a sound source appearing on video data obtained by imaging a monitoring target area can be displayed as visual image information, and it is possible to improve the efficiency of the user's monitoring business. Therefore, the user can visually recognize the sound source appearing on the video image of the displayed area.

DETAILED DESCRIPTION OF THE PREFERRED EMBODIMENTS

Hereinafter, embodiments (hereafter, referred to as the present embodiments) which specifically disclose a monitoring system and a monitoring method according to the present disclosure will be described in detail with reference to the appropriate drawings. However, in some cases, descriptions more detailed than required will be omitted. For example, in some cases, a detailed description for widely known items or a repeated description of substantially the same configuration will be omitted. This is to prevent the description from becoming unnecessary redundant and to facilitate the easy understanding for those skilled in the art. The drawings attached hereto and the description hereinafter are provided in order for those skilled in the art to sufficiently understand the present disclosure, and there is no intention to limit the aspects described in the Claims attached hereto. Hereinafter, a sound source display system that displays a sound source appearing on video data obtained by imaging a monitoring target area as visual image information will be described as an example of the monitoring system. However, the monitoring system and the monitoring method according to the present disclosure are not limited to the usage of monitoring a state of a target such as a person, but may be applied to each usage of performing an observation and a measurement for checking a state in a predetermined area or examining comments and evaluations of a product or a service.

Figure 1:
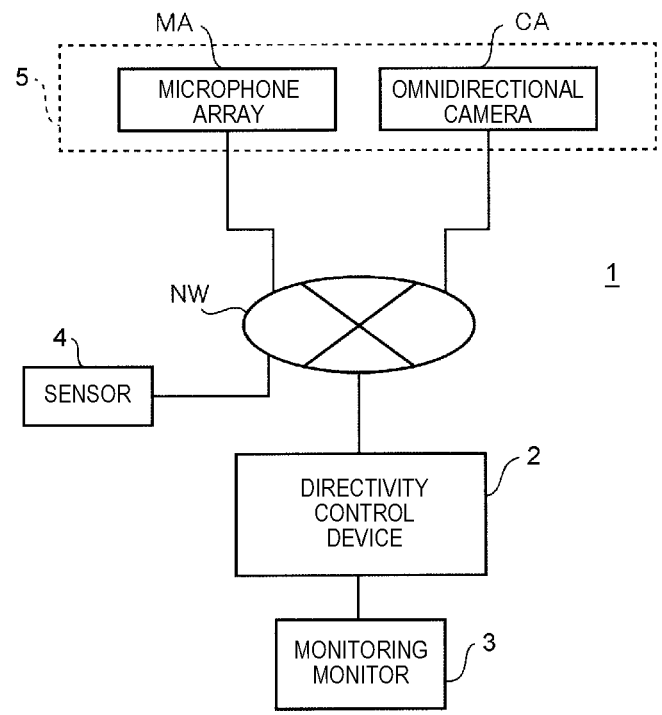
FIG. 1 is a block diagram illustrating an example of a system configuration of a sound source display system according to the present embodiment.

FIG. 1 is a block diagram illustrating an example of a system configuration of sound source display system 1 according to the present embodiment. Sound source display system 1 illustrated in FIG. 1 is configured to include omnidirectional camera CA, microphone array MA, directivity control device 2, monitoring monitor 3, and sensor 4. Omnidirectional camera CA, microphone array MA, directivity control device 2 and sensor 4 are connected to each other via network NW such that data communication can be performed. Network NW may be a wired network (for example, an intranet or the Internet) or may be a wireless network (for example, a wireless local area network (LAN)).

Omnidirectional camera CA is a camera mounting a fish-eye lens which can image a state of a monitoring target area as an omnidirectional image (that is, an image having directions of 360°). In other words, omnidirectional camera CA functions as a monitor camera that can image the state of the monitoring target area (that is, imaging area) where the device itself is installed. Omnidirectional camera CA transmits the data of the omnidirectional image obtained by imaging (hereafter, simply referred to as omnidirectional image data) to directivity control device 2 via network NW.

Microphone array MA collects voices in the monitoring target area (that is, sound collection area) where the device itself is installed in a non-directional state. In the present embodiment, the imaging area and the sound collection area are described as being the same. Microphone array MA includes donut-shaped housing (housing is not illustrated) 5 in which, for example, an opening is formed at the center thereof. A plurality of microphone units is concentrically arrayed along the circumferential direction around the opening. For example, a high sound quality and small type electret condenser microphone (ECM) is used as the microphone unit (hereafter, simply referred to as a microphone). Microphone array MA transmits the voice data obtained by the sound collection to directivity control device 2 via network NW.

In addition, by omnidirectional camera CA being incorporated in the inner side of the opening formed at the center of housing 5 of microphone array MA, omnidirectional camera CA and microphone array MA are coaxially disposed and accommodated in housing 5. In this way, since an optical axis of omnidirectional camera CA and a central axis of housing 5 of microphone array MA are coincident, the imaging area and the sound collection area become substantially the same in the axial circumferential direction, and thus, an image position (that is, a position of a subject seen from omnidirectional camera CA) and a collected sound position (that is, a sound source position seen from microphone array MA) can be expressed on the same coordinates system. Therefore, a correspondence relationship between the image position and the collected sound position can be clear. Thus, when forming the directivity of the voice collected by microphone array MA described below as the user designation-based directivity direction, directivity control device 2 can use the coordinates indicating the direction obtained by omnidirectional camera CA based on the user's designation as the directivity direction seen from microphone array MA, and thus, it is possible to easily perform a calculation of the directivity direction.

Directivity control device 2 can form the directivity on the voice data collected by microphone array MA and can emphasize the voice from the directivity direction. Directivity control device 2 is configured to have, for example, a personal computer (PC). In addition, directivity control device 2 calculates a sound pressure at the position corresponding to a pixel configuring image data in unit of a pixel based on the image data of the imaging area captured by omnidirectional camera CA and the voice data collected by microphone array MA, and generates a voice heat map described below. In addition, directivity control device 2 is connected to monitoring monitor 3 and displays the voice heat map on monitoring monitor 3. Directivity control device 2 may be configured to include a communication terminal such as a mobile phone, a tablet terminal or a smart phone instead of using the PC.

Monitoring monitor 3 as an example of a display, displays the omnidirectional image data captured by omnidirectional camera CA. In addition, monitoring monitor 3 displays composite image data in which the voice heat map generated by directivity control device 2 is superimposed on the omnidirectional image data. Monitoring monitor 3 may be configured as a device integrated with directivity control device 2.

Sensor 4 detects an event which starts the sound source display operation described below. As sensor 4, for example, an illuminance sensor that detects the brightness around a location where sensor 4 is installed, a temperature sensor that detects the temperature of the location where sensor 4 is installed, and a human sensor that senses infrared reflected from a person in the vicinity of the location where sensor 4 is installed, are included.

Figure 2:
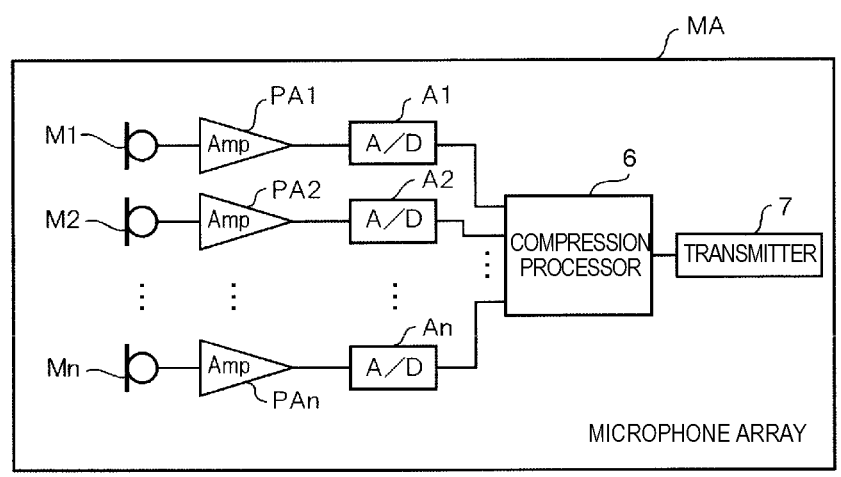
FIG. 2 is a block diagram illustrating an example of an internal configuration of a microphone array in detail.

FIG. 2 is a block diagram illustrating an example of an internal configuration of microphone array MA in detail.

Microphone array MA illustrated in FIG. 2 is configured to include a plurality of microphones M1 to Mn (for example, n=8), a plurality of amplifiers PA1 to PAn that amplifies output signals from each of the plurality of microphones M1 to Mn, and a plurality of A/D converters A1 to An that converts analog signals output from each of amplifiers PA1 to PAn to digital signals respectively, compression processor 6, and transmitter 7.

Compression processor 6 generates a packet of the voice data based on the digital voice signals output from A/D converters A1 to An. Transmitter 7 transmits the packet of the voice data generated by compression processor 6 to directivity control device 2 via network NW.

As described above, microphone array MA amplifies the output signals from microphones M1 to Mn using amplifiers PA1 to PAn, converts the analog voice data to the digital voice data using A/D converters A1 to An, and then, generates the packet of the voice data using compression processor 6, and transmits the packet of the voice data to directivity control device 2 via network NW.

Figure 3:
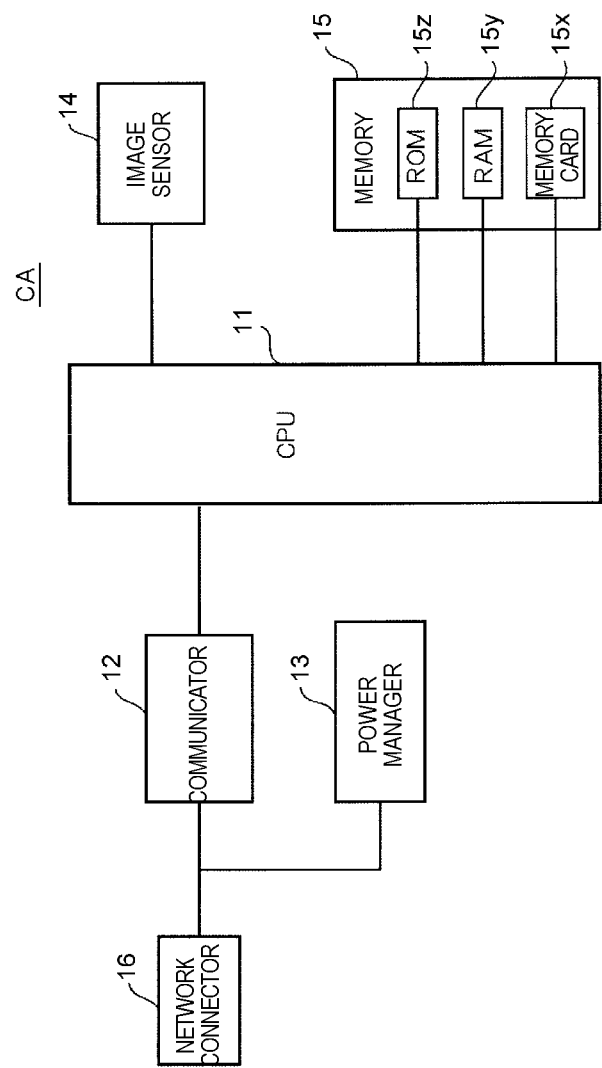
FIG. 3 is a block diagram illustrating an example of an internal configuration of an omnidirectional camera in detail.

FIG. 3 is a block diagram illustrating an example of an internal configuration of omnidirectional camera CA in detail. Omnidirectional camera CA illustrated in FIG. 3 is configured to include CPU 11, communicator 12, power manager 13, image sensor 14, memory 15, and network connector 16. In FIG. 3, a fish-eye lens is omitted to be illustrated at the front stage (that is, right side in FIG. 3) of image sensor 14.

CPU 11 performs signal processing that totally manages the overall operation control of each unit in omnidirectional camera CA, data input output processing between other units, data operation processing, and data storage processing. Processors such as a micro processing unit (MPU) or a digital signal processor (DSP) may be provided instead of CPU 11.

For example, CPU 11 generates cut-out image data which is an image of a specific range (direction) cut out from the omnidirectional image data according to a designation of the user who operates directivity control device 2, and stores the cut-out image data in memory 15.

Image sensor 14 is configured to include, for example, a complementary metal oxide semiconductor (CMOS) sensor or a charge-coupled device (CCD), and acquires the omnidirectional image data by performing processing for capturing an optical image of the reflection light collected by fish-eye lens (not illustrated) from the imaging area on a light receiving surface.

Memory 15 includes ROM $15z$ that stores a program or set value data regulating an operation of omnidirectional camera CA, RAM $15y$ that stores the omnidirectional image data or the cut-out image data which is the image cut out therefrom, or work data, and memory card $15x$ that is removably connected to omnidirectional camera CA and stores various data items.

Communicator 12 is a network interface (I/F) that controls the data communications with network NW connected to communicator 12 via network connector 16.

Power manager 13 supplies a DC power to each unit of omnidirectional camera CA. In addition, power manager 13 may supply the DC power to the devices connected to network NW via network connector 16.

Network connector 16 is a connecter that transmits the omnidirectional image data or two-dimensional panorama image data to directivity control device 2 via network NW, and that can supply the power via a network cable.

Figure 4:
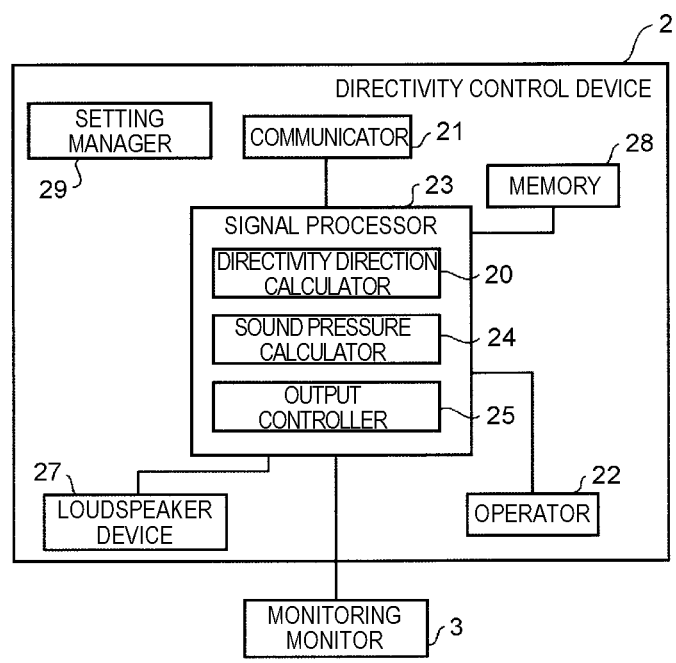
FIG. 4 is a block diagram illustrating an example of an internal configuration of a directivity control device in detail.

FIG. 4 is a block diagram illustrating an example of an internal configuration of directivity control device 2 in detail. Directivity control device 2 illustrated in FIG. 4 is configured to include at least communicator 21, operator 22, signal processor 23, loudspeaker device 27, memory 28, and setting manager 29. Signal processor 23 includes directivity direction calculator 20, sound pressure calculator 24, and output controller 25. In addition, directivity control device 2 is connected to monitoring monitor 3.

Setting manager 29 includes a coordinates conversion formula that converts the coordinates indicating the position on the omnidirectional image data designated by the user into coordinates indicating the directivity direction from microphone array MA toward the actual sound source position corresponding to the position on the omnidirectional image data designated by the user on monitoring monitor 3 on which the omnidirectional image data captured by omnidirectional camera CA is displayed. Directivity direction calculator 20 described below calculates the coordinates ($\theta$MAh, $\theta$MAv) indicating the directivity direction from microphone array MA toward the sound source position corresponding to the position on the omnidirectional image data designated by the user, using the coordinates conversion formula held by setting manager 29. Details of the coordinates calculation processing are disclosed in, for example, in Japanese Patent Unexamined Publication No. 2015-029241. Here, $\theta$MAh represents a horizontal angle of the directivity direction from microphone array MA toward the voice position, and $\theta$MAv represents a vertical angle of the directivity direction from microphone array MA toward the voice position. The sound source position is a position of the actual sound source corresponding to the position designated from operator 22 by a user's finger or a stylus pen on the video data displayed on monitoring monitor 3.

In addition, setting manager 29 holds a first threshold value and a second threshold value which are compared with sound pressure p for every pixel calculated by sound pressure calculator 24. Here, sound pressure p is used as an example of a sound parameter regarding the sound source, represents a magnitude of the sound collected by microphone array MA, and is different from a volume which represents the level of the sound output from loudspeaker device 27. The first threshold value and the second threshold value are values compared with the sound pressure of the voice generated in the imaging area, and are set to arbitrary values determined to be noisy as the sound source by the user. Here, the sound source is a sound source in a broad sense including not only the sound source actually generating the sound but also a place where a sound as a result of propagation from the sound source can be heard. In addition, a plurality of threshold values may be set, and thus, two threshold values of the first threshold value and the second threshold value which is larger than the first threshold value are set according to the present embodiment (the first threshold value<the second threshold value). In addition, as described below, a part of pixel having a sound pressure higher than the second threshold value is drawn, for example, in red on monitoring monitor 3 on which the omnidirectional image data is displayed. In addition, a part of pixel having a sound pressure higher than the first threshold value and equal to or lower than the second threshold value is drawn, for example, in blue on monitoring monitor 3 on which the omnidirectional image data is displayed. In addition, a part of pixel having a sound pressure equal to or lower than the first threshold value is drawn, for example, in colorless on monitoring monitor 3 on which the omnidirectional image data is displayed, that is, the display color of the omnidirectional image data is not changed.

Communicator 21 receives the omnidirectional image data or the cut-out video data transmitted from omnidirectional camera CA and the voice data transmitted from microphone array MA, and outputs the data items to signal processor 23.

Operator 22 is a user interface (UI) for notifying signal processor 23 of the content of the user's input operation, and is configured to include pointing devices such as a mouse and a keyboard. In addition, operator 22 may be configured to include a touch panel or a touch pad which is arranged corresponding to a screen of monitoring monitor 3, and a direct input operation can be input by the user's finger or a stylus pen.

When a red region R1 of voice heat map MP (refer to FIG. 8 and FIG. 9) displayed on monitoring monitor 3 is designated by the user, operator 22 acquires the coordinates data indicating the designated position and outputs the data to signal processor 23.

Memory 28 is configured to include, for example, a random access memory (RAM), and functions as a program memory, a data memory, and a work memory when directivity control device 2 operates. In addition, memory 28 stores voice heat map MP described below (refer to FIG. 8 and FIG. 9).

Signal processor 23 is configured to include a central processing unit (CPU), a micro processing unit (MPU), or a digital signal processor (DSP), and performs control processing that totally manages the overall operation control of each unit of directivity control device 2, data input output processing between other units, data operation (calculation) processing, and data storage processing. Signal processor 23 includes at least directivity direction calculator 20, sound pressure calculator 24, and output controller 25.

When an arbitrary position on monitoring monitor 3 on which the omnidirectional image data captured by omnidirectional camera CA is displayed is designated by the user, directivity direction calculator 20 calculates the directivity direction from microphone array MA toward the sound source position corresponding to the designated position using the coordinates conversion formula held in setting manager 29. That is, directivity direction calculator 20 calculates the coordinates ($\theta$MAh, OMAN) of the directivity direction from microphone array MA toward the sound source position corresponding to the coordinates (X, Y) of the designated position on the omnidirectional image data.

Sound pressure calculator 24 calculates the sound pressure of each pixel configuring the omnidirectional image data based on the omnidirectional image data captured by omnidirectional camera CA and the voice data collected by microphone array MA. The sound pressure calculation processing is a known technology and the detailed description of the processing will be omitted. In this way, sound pressure calculator 24 generates a sound pressure map in which the calculated value of the sound pressure is assigned to the corresponding position of the pixel for each pixel configuring the omnidirectional image data. The description is made such that sound pressure calculator 24 generates the sound pressure map in which the value of the sound pressure calculated in unit of pixel is assigned to the corresponding position of the pixel. However, sound pressure calculator 24 may generate the sound pressure map by calculating the average value of the sound pressure values in the unit of pixel block formed from a predetermined number of pixels (for example, 4 pixels) without calculating the sound pressure for each pixel, and assigning the corresponding average value of the sound pressure values to the corresponding predetermined number of pixels.

Output controller 25 controls each operation of monitoring monitor 3 and loudspeaker device 27, causes the omnidirectional image data or the cut-out video data transmitted from omnidirectional camera CA to be output and displayed on monitoring monitor 3, and causes the voice data transmitted from microphone array MA to be output to loudspeaker device 27.

In addition, output controller 25 performs directivity forming processing on the voice data collected by microphone array MA using the voice data collected by microphone array MA and the coordinates ($\theta$MAh, $\theta$MAv) of the directivity direction calculated by directivity direction calculator 20, and then, performs the processing that emphasizes the voice data of the directivity direction. The voice data directivity forming processing is a known technology disclosed in, for example, Japanese Patent Unexamined Publication No. 2015-029241.

In addition, output controller 25 generates voice heat map MP (refer to FIG. 8 and FIG. 9) by performing below-described color conversion processing on the sound pressure map generated by sound pressure calculator 24.

As an example of a voice output, loudspeaker device 27 outputs the voice data collected by microphone array MA or the voice data collected by microphone array MA and the directivity of which is formed by signal processor 23. Loudspeaker device 27 may be configured as a device separate from directivity control device 2.

Operations of the above-described sound source display system 1 will be described.

Figure 5:
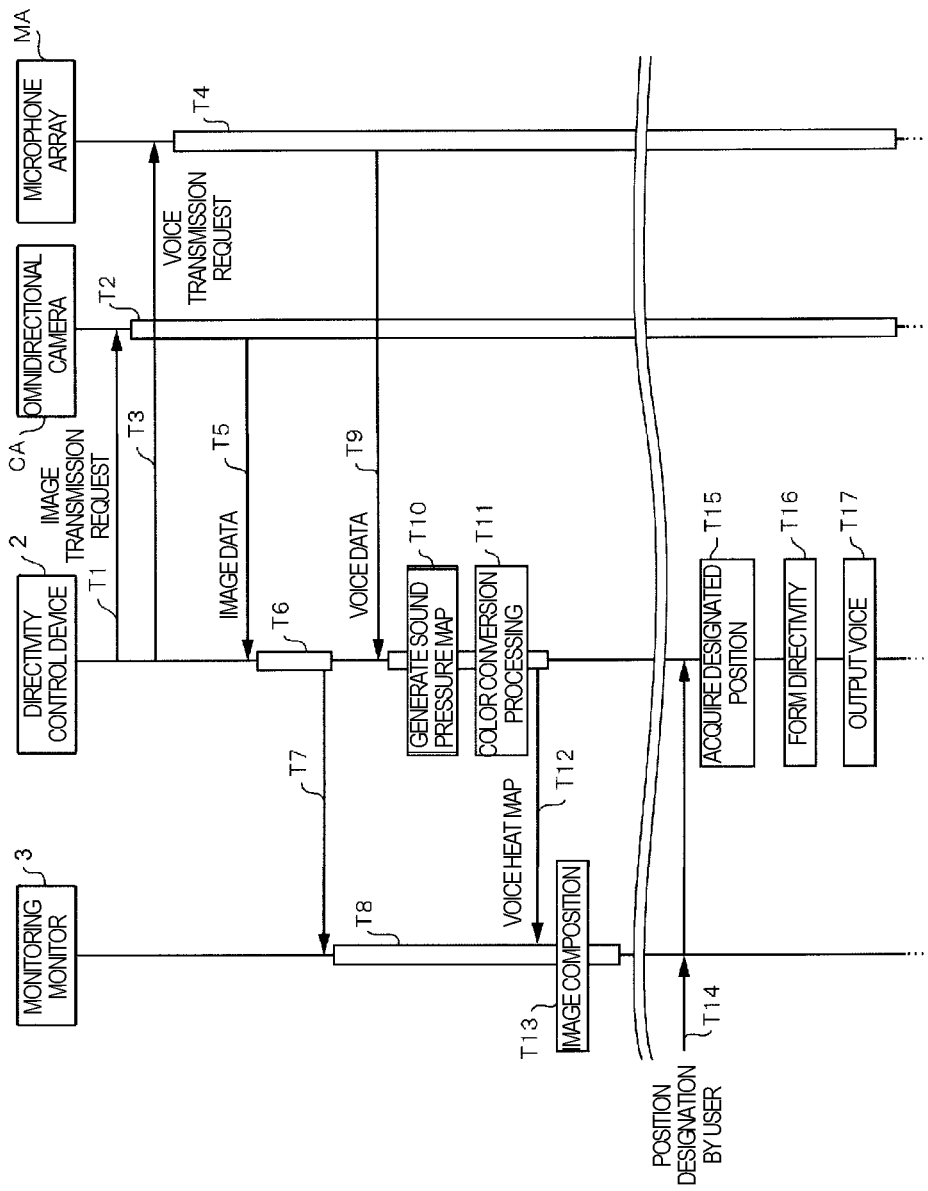
FIG. 5 is a sequence diagram describing an example of an operation procedure of displaying a sound source in the sound source display system according to the present embodiment in detail.

FIG. 5 is a sequence diagram describing an example of an operation procedure of displaying the sound source in sound source display system 1 according to the present embodiment in detail.

In FIG. 5, when a predetermined start event is detected, directivity control device 2 performs an image transmission request for requesting omnidirectional camera CA to transmit the omnidirectional image data of the imaging area (T1). The start event includes, for example, the following events: the user presses down a map display button (not illustrated) disposed on operator 22 of directivity control device 2, the user presses down an icon (not illustrated) indicating the image transmission request displayed on monitoring monitor 3, a timer incorporated in directivity control device 2 starts, and sensor 4 detects the event. An example of the timer starting includes the case where the current time enters a time span (for example, 8:00 in the morning to 17:00 in the afternoon) set in advance. In addition, examples of events that sensor 4 detects the event include the events: an illuminance sensor as an example of sensor 4 detects the brightness equal to or higher than a predetermined value, a temperature sensor as an example of sensor 4 detects the ambient temperature equal to or higher than a predetermined temperature, and a human sensor as an example of sensor 4 senses an infrared reflected from a person. In this way, in a case where the condition desired by the user is satisfied, directivity control device 2 can cause the operation of displaying the sound source illustrated in FIG. 5 to start, and thus, it is possible to improve the convenience.

When the image transmission request is received from directivity control device 2, omnidirectional camera CA starts an operation (imaging operation) for imaging a situation in the imaging area (T2). Directivity control device 2 performs a voice transmission request for requesting microphone array MA to transmit the voice data of the sound collection area (T3). When the voice transmission request is received from directivity control device 2, microphone array MA starts an operation (sound collection operation) for collecting the voice in the sound collection area (T4). Here, an office, a warehouse, a hall, and the like can be exemplified as the imaging area (sound collection area).

Omnidirectional camera CA transmits the omnidirectional image data of the imaging area obtained from the image to directivity control device 2 (T5). When the omnidirectional image data transmitted from omnidirectional camera CA is received, directivity control device 2 performs processing that converts the image data into the image data suitable for displaying on monitoring monitor 3 (T6), and outputs the conversion resulting image data to monitoring monitor 3 (T7). The processing of STEP T6 may be omitted. When the image data output from directivity control device 2 is received, monitoring monitor 3 displays the image data of the imaging area captured by omnidirectional camera CA (T8).

When the voice data transmitted from microphone array MA is received (T9), directivity control device 2 generates the sound pressure map in which the calculation value of the sound pressure is assigned to the position of a corresponding pixel for each pixel configuring the omnidirectional image data (T10). The sound pressure map is the data in which the calculated sound pressure value of the voice is assigned to the image data obtainable by imaging the imaging area for each pixel configuring the image data.

Figure 6:
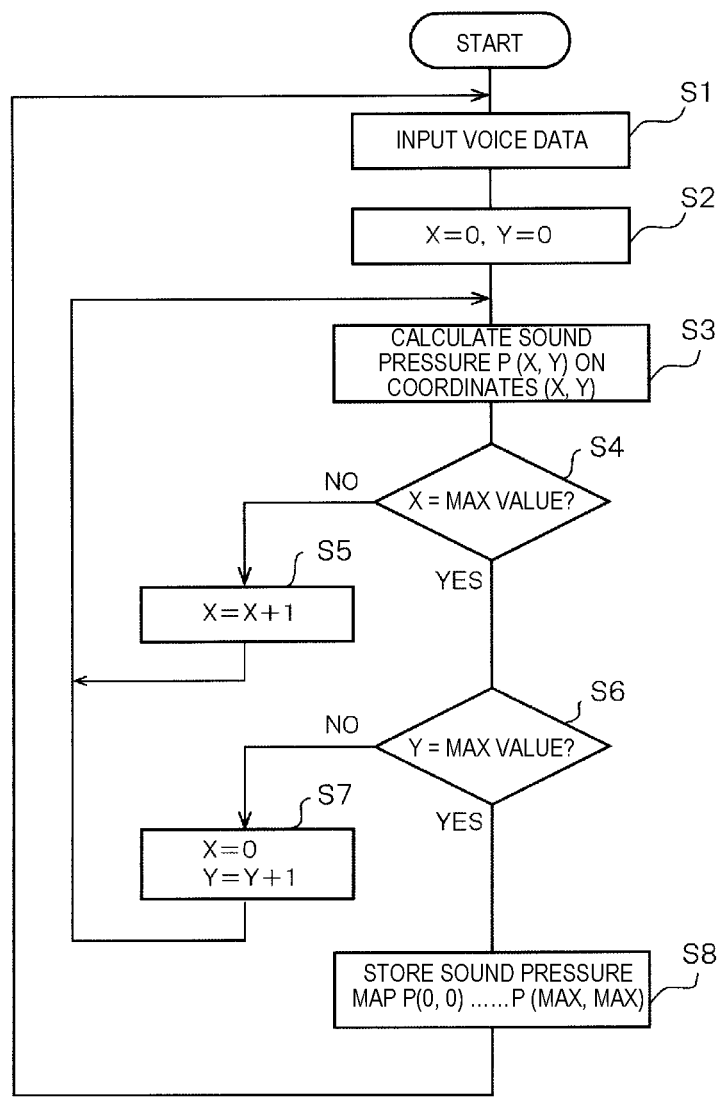
FIG. 6 is a flow chart describing an example of a procedure of generating a sound pressure map in the directivity control device according to the present embodiment in detail.

FIG. 6 is a flow chart describing an example of a procedure of generating the sound pressure map in directivity control device 2 according to the present embodiment in detail.

In FIG. 6, communicator 21 of directivity control device 2 receives the voice data transmitted from microphone array MA and outputs the voice data to signal processor 23. Signal processor 23 inputs the voice data transmitted from microphone array MA (51).

Setting manager 29 sets the origin point (0, 0) of the coordinates (X, Y) representing the position of each pixel configuring the omnidirectional image data captured by omnidirectional camera CA (S2). Hereinafter, in order to make it easy to understand the description, the coordinates (X, Y) representing the position of the pixel are set in a rectangular-shaped range while a left upper corner of the omnidirectional image data is the origin (0, 0) and the right lower corner of the omnidirectional image data is the final position (MAX, MAX). The processing in STEP S2 may be performed by directivity direction calculator 20.

Oriented direction calculator 20 calculates the coordinates (θMAh, θMAv) of the directivity direction from microphone array MA toward the actual position corresponding to the position indicated on the coordinates (X, Y) on the omnidirectional image data. Sound pressure calculator 24 calculates sound pressure P on the coordinates (θMAh, θMAv) of the directivity direction corresponding to the coordinates (X, Y) on the omnidirectional image data (S3).

Then, sound pressure calculator 24 determines whether or not the coordinate X reaches the value MAX (S4). In a case where the coordinate X does not reach the value MAX (No in S4), sound pressure calculator 24 increments the value of the coordinate X (S5). Then, the processing by directivity control device 2 returns to STEP S3.

On the other hand, in a case where the coordinate X reaches the value MAX (Yes in S4), sound pressure calculator 24 determines whether or not the coordinate Y reaches the value MAX (S6). In a case where the coordinate Y does not reach the value MAX (No in S6), sound pressure calculator 24 returns the value of the coordinate X to zero and increments the value of the coordinate Y (S7). Then, the processing by directivity control device 2 returns to STEP S3.

On the other hand, in STEP S6, in a case where the coordinate Y reaches the value MAX (Yes in S6), sound pressure calculator 24 generates the sound pressure map in which sound pressure P (X, Y) corresponding to each pixel is assigned to the position of each pixel of the omnidirectional image data, using the calculation result in STEP S3. Sound pressure calculator 24 stores the data of the generated sound pressure map in memory 28 (S8). Then, the processing by directivity control device 2 returns to STEP 51.

Back to FIG. 5, after the generation of the sound pressure map in STEP T10, output controller 25 performs color conversion processing on the generated sound pressure map (T11). As the color conversion processing, output controller 25 compares sound pressure P corresponding to each pixel indicated on the sound pressure map with the threshold value, performs the color coding on the sound pressure exceeding the threshold value, and generates voice heat map MP. For example, the first threshold value and the second threshold value which has a larger value than the first threshold value are used as the threshold value according to the present embodiment (the first threshold value<the second threshold value).

Figure 7:
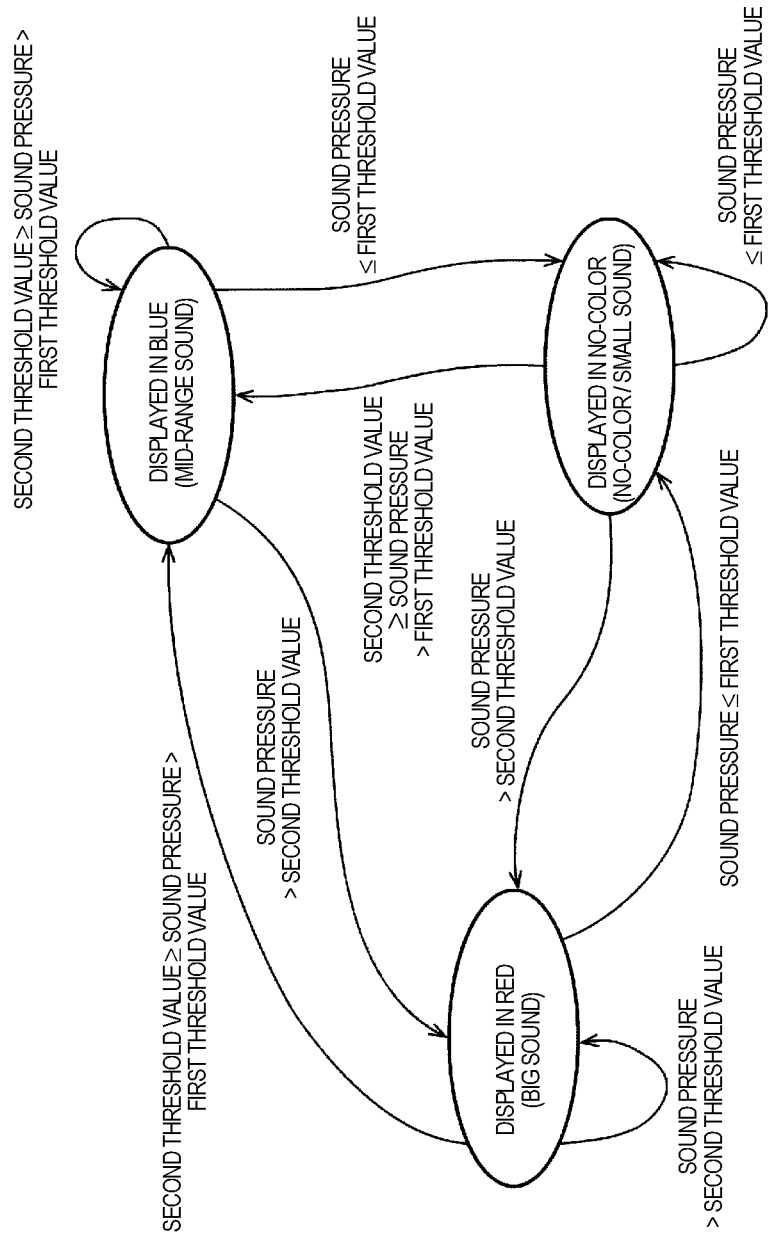
FIG. 7 is a state transition diagram illustrating a color coded state of sound image information in which a sound pressure of each image is converted into visual information.

FIG. 7 is a state transition diagram illustrating a color coded state of the sound image information in which the sound pressure of each pixel is converted into visual information. For example, in a case where the sound pressure exceeds the second threshold value, the sound image information in which the sound pressure is converted into the visual information is drawn in red as a loud sound and displayed as the sound source image information of the red region. In a case where the sound pressure is equal to or lower than the second threshold value and exceeds the first threshold value, the sound image information is drawn in blue as the mid-range sound and displayed as the sound source image information of the blue region. In a case where the sound pressure is equal to or lower than the first threshold value, the sound image information is drawn in colorless as the quiet sound and displayed as the sound source image information of the colorless region.

In this way, output controller 25 compares the calculation value of the sound pressure with a plurality of threshold values including the first threshold value and the second threshold value, and generates voice heat map MP having the sound image information such that the sound image information in the omnidirectional image data changes depending on the level of the sound pressure. In this way, using voice heat map MP, the user can know not only the location of the sound source but also the level of the sound pressure in the omnidirectional image data captured by omnidirectional camera CA. Here, two threshold values such as the first threshold value and the second threshold value are used as the threshold value. However, one threshold value or three or more threshold values may be used. In addition, the threshold value can be set as an arbitrary value in accordance with the sound pressure of the voice that the user wants to monitor.

Directivity control device 2 transmits the data of voice heat map MP generated by the color conversion processing to monitoring monitor 3 (T12). Monitoring monitor 3 generates and displays a composite image (refer to FIG. 8 and FIG. 9) in which the data of voice heat map MP transmitted in STEP T12 is superimposed on the omnidirectional image data captured by omnidirectional camera CA (T13). The composite image generation processing may be performed by output controller 25 of directivity control device 2. In this case, output controller 25 generates the composite image in which the data of voice heat map MP generated in STEP T11 is superimposed on the omnidirectional image data captured by omnidirectional camera CA.

However, according to the present embodiment, in order not to degrade the visibility of the composite image, among the data of voice heat map MP, a portion of the sound image information generated in the color conversion processing is superimposed on the omnidirectional image data. The sound pressure value in the sound pressure map may not be or may be superimposed on the omnidirectional image data.

STEP T5 to STEP T13 described above are repeated until directivity control device 2 detects a stop event and the stop event is performed on omnidirectional camera CA to stop the image transmission and microphone array MA to stop the voice transmission. The stop event includes the events that the power of directivity control device 2 is turned off, that directivity control device 2 is shutdown, and that processing is performed in order to instruct to stop the voice heat map MP generation processing.

Figure 8:
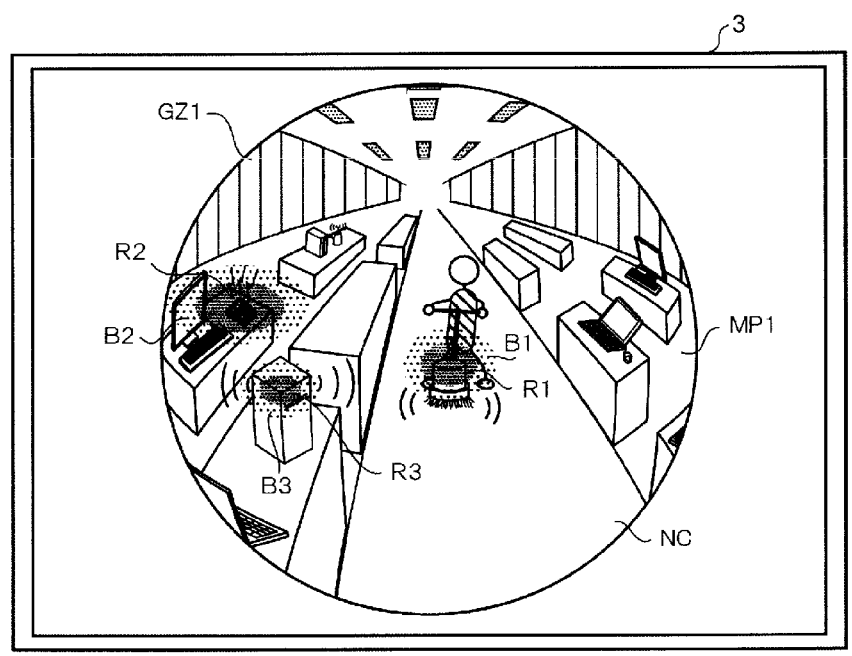
FIG. 8 is a diagram illustrating a first example of composite image data in which data of voice heat map is superimposed on omnidirectional image data.
Figure 9:
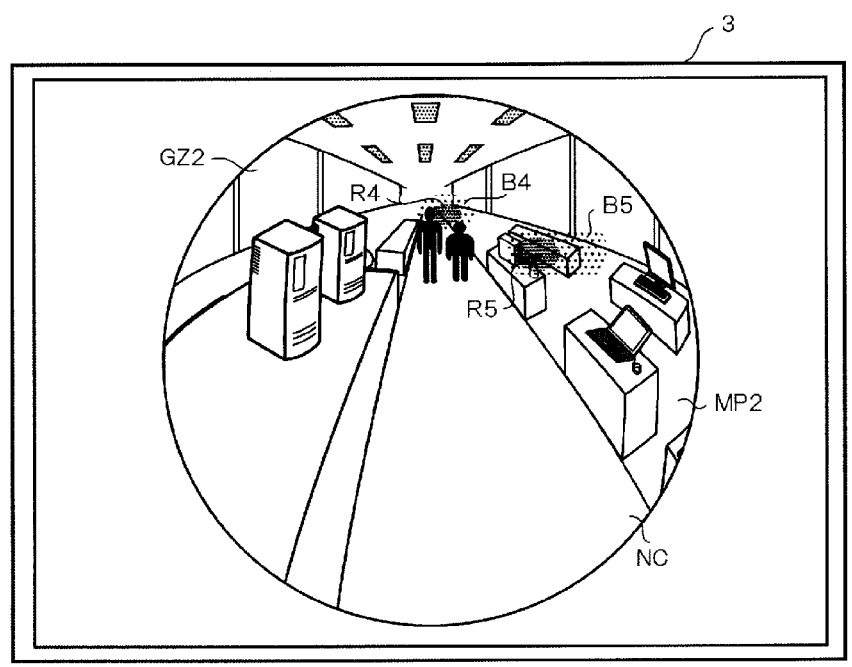
FIG. 9 is a diagram illustrating a second example of composite image data in which data of voice heat map is superimposed on omnidirectional image data.

FIG. 8 is a diagram illustrating data of composite image GZ1 in which data of voice heat map MP1 is superimposed on the omnidirectional image data. In composite image GZ1 displayed on monitoring monitor 3, for example, voice heat map MP1 generated by output controller 25 is superimposed on the omnidirectional image data captured by omnidirectional camera CA installed in the office. Housing 5 in which omnidirectional camera CA and microphone array MA are coaxially disposed is mounted such that the optical axis is in the horizontal direction (for example, the direction along a corridor in the vicinity of the center of composite image GZ1 illustrated in FIG. 8). In FIG. 8 and FIG. 9, the omnidirectional image data captured by omnidirectional camera CA is captured through a fish-eye lens.

In FIG. 8, for example, red region R1 drawn in red and blue region B1 drawn in blue surrounding red region R1 are displayed at the center of a sheet of composite image GZ1. A motor sound of a cleaner used by a cleaning staff is present in the range surrounded by red region R1 and blue region B1 as a sound source.

In addition, for example, red region R2 drawn in red and blue region B2 drawn in blue surrounding red region R2 are displayed at the left side of the sheet of composite image GZ1. A ring tone of a fixed telephone installed in an office is present in the range surrounded by red region R2 and blue region B2 as the sound source.

In addition, for example, red region R3 drawn in red and blue region B3 drawn in blue surrounding red region R3 are displayed at a slightly lower side of the left side of the sheet of composite image GZ1. A sound of a fan of the PC installed in the office is present in the range surrounded by red region R3 and blue region B3 as the sound source. In another portion of composite image GZ1, since the calculated sound pressure value is equal to or lower than the first threshold value (refer to FIG. 7), colorless non-region NC is displayed. As described above, in order not to degrade the visibility of composite image GZ1 illustrated in FIG. 8, only red regions R1, R2, and R3 and blue regions B1, B2, and B3 among the data of voice heat map MP1 are superimposed on the omnidirectional image data, and hereinafter, it will be the same.

FIG. 9 is a diagram illustrating data of composite image GZ2 in which data of voice heat map MP2 is superimposed on the omnidirectional image data. In composite image GZ2 displayed on monitoring monitor 3, for example, voice heat map MP2 generated by output controller 25 is superimposed on the omnidirectional image data captured by omnidirectional camera CA installed in the office. In this case also, housing 5 in which omnidirectional camera CA and microphone array MA are coaxially disposed is mounted such that the optical axis is in the horizontal direction (for example, the direction along a corridor in the vicinity of the center of composite image GZ2 illustrated in FIG. 9). Housing 5 may be mounted, for example, on the ceiling of a store, an office, or a hall, and may be mounted such that the optical axis is in the vertical direction.

In FIG. 9, for example, red region R4 drawn in red and blue region B4 drawn in blue surrounding red region R4 are displayed at the upper center of a sheet of composite image GZ2. Voices of two employees are present in the range surrounded by red region R4 and blue region B4 as the sound source.

In addition, red region R5 drawn in red and blue region B5 drawn in blue surrounding red region R5 and extending to the right side are displayed at a slightly right side of the sheet of composite image GZ2. An operation sound of a machine installed in the office is present in the range surrounded by red region R5 and blue region B5 as the sound source. In another portion of composite image GZ2, since the calculated sound pressure value is equal to or lower than the first threshold value (refer to FIG. 7), colorless non-region NC is displayed.

Here, the omnidirectional image is displayed on monitoring monitor 3 as a circle-shaped image as it is. However, the image may be converted into a panorama image and displayed as a two dimensional rectangular image (panorama image). In this case, the visibility of the composite image for the user is further improved.

Back to FIG. 5, in a state that the composite image data (that is, the image in which the data of voice heat map MP generated in STEP T11 is superimposed on the omnidirectional image data) is displayed on monitoring monitor 3, it is assumed that the user designates the position of the sound image information (for example, red region) on the composite image data via operator 22 (T14). In this case, directivity control device 2 acquires the coordinates of the designated position on the composite image data (T15). In a case where monitoring monitor 3 is configured to have a touch panel, directivity control device 2 can easily acquire the coordinates of the position of the sound image information by the user touching the screen of monitoring monitor 3 for inputting.

Directivity control device 2 forms the directivity of the voice collected by microphone array MA to the directivity direction from microphone array MA toward the actual sound source position corresponding to the position on the composite image data designated by the user, and emphasizes the voice in the directivity direction (T16). Loudspeaker device 27 outputs the voice which is emphasized in the directivity direction (T17). In this way, the user can clearly hear the voice coming out from the sound source displayed as the sound image information, and can grasp and pursue the causes of the sound.

As described above, in sound source display system 1 according to the present embodiment, omnidirectional camera CA images the image of the imaging area. Microphone array MA collects the voice in the imaging area. Monitoring monitor 3 displays the image of the imaging area captured by omnidirectional camera CA. Sound pressure calculator 24 in signal processor 23 calculates the sound parameter (for example, sound pressure P) relating to the sound source appearing in the image data of the imaging area using the voice data collected by microphone array MA. Output controller 25 in signal processor 33 compares sound pressure P obtained from the calculation with the threshold values (for example, the first threshold value and the second threshold value), and causes the sound source image information (for example, the sound image information) in which the sound pressure is converted into the visual information to be superimposed on the image data of the imaging area according to the result of the comparison, and to be displayed on monitoring monitor 3.

In this way, sound source display system 1 can display the sound source (that is, sound generation source) appearing on the video data obtained by imaging the monitoring target area (for example, the imaging area) as the visual sound image information. Accordingly, the user can visually recognize the sound source appearing in the displayed video image of the imaging area.

In addition, in sound source display system 1, for example, a plurality of threshold values are set, and sound pressure calculator 24 of signal processor 23 generates a plurality of types of sound image information according to the result of comparison between sound pressure P of the sound source and each of the threshold values (for example, the first threshold value and the second threshold value). In this way, directivity control device 2 can generate voice heat map MP that can make the user intuitively grasp not only the location (position) of the sound source appearing on the omnidirectional image data captured by omnidirectional camera CA but also the level of the sound pressure in the sound source.

In addition, in sound source display system 1, in a case where the sound image information (for example, red region R2) of the composite image data (for example, refer to FIG. 8 and FIG. 9) displayed on monitoring monitor 3 is designated by the user, output controller 25 of signal processor 23 forms the directivity of the voice to the direction (that is, the directivity direction) from microphone array MA toward the actual sound source position corresponding to the coordinates of the position of the designated sound image information, and causes the voice to be output from loudspeaker device 27. In this way, the user can clearly hear the voice output from the sound source displayed on monitoring monitor 3 as the sound image information, and can efficiently grasp and pursue the causes of the sound.

In addition, in sound source display system 1, sensor 4 that detects a predetermined target is provided. In a case where the predetermined target is detected by sensor 4, omnidirectional camera CA transmits the omnidirectional image data obtained by imaging to directivity control device 2, and microphone array MA transmits the voice data obtained by collecting the sound to directivity control device 2. In this way, in a case where the condition desired by the user is satisfied, directivity control device 2 can start the operation for displaying the sound source on the omnidirectional image data, and thus, it is possible to improve the convenience for the user.

In addition, in sound source display system 1, omnidirectional camera CA and microphone array MA are coaxially disposed. In this way, since an optical axis of omnidirectional camera CA and a central axis of housing 5 of microphone array MA are coincident, the imaging area and the sound collection area become substantially the same in the axial circumferential direction, and thus, an image position (that is, a position of a subject seen from omnidirectional camera CA) and a collected sound position (that is, a sound source position seen from microphone array MA) can be expressed on the same coordinates system. Therefore, a correspondence relationship between the image position and the collected sound position can be clear. Thus, when forming the directivity of the voice collected by microphone array MA as the user designation-based directivity direction, directivity control device 2 can use the coordinates indicating the direction obtained by omnidirectional camera CA based on the user's designation as the directivity direction seen from microphone array MA, and thus, it is possible to easily perform a calculation of the directivity direction.

Next, another embodiment will be described.

Figure 10:
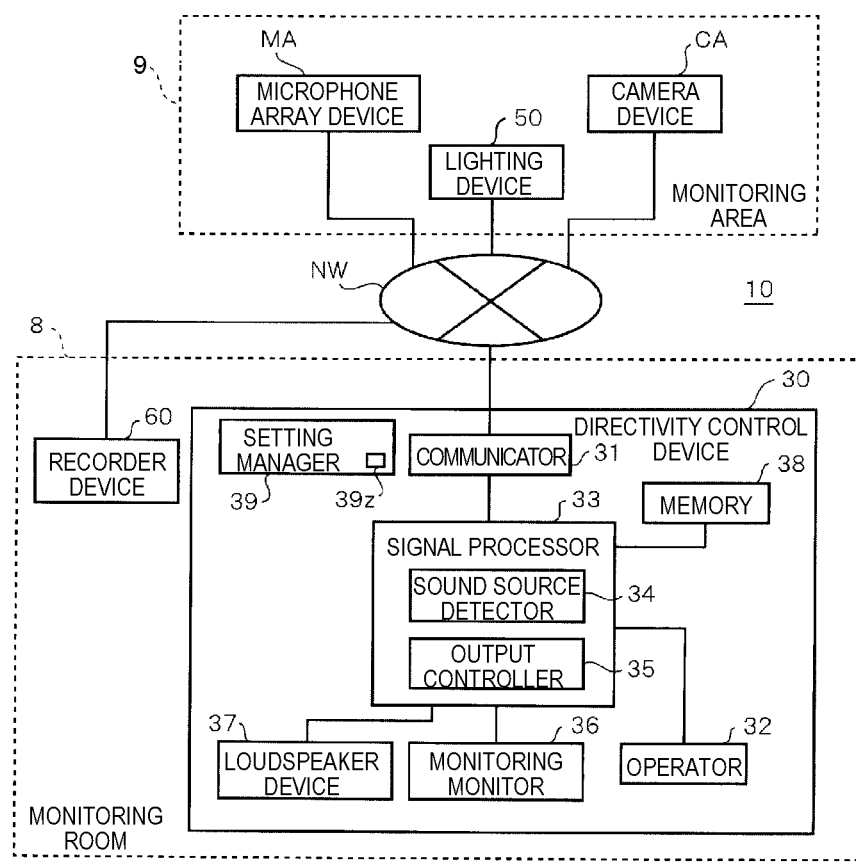
FIG. 10 is a block diagram illustrating an example of an internal configuration of a monitoring control system according to a second embodiment in detail.

FIG. 10 is a block diagram illustrating an example of an internal configuration of monitoring control system 10 according to the present embodiment in detail. Monitoring control system 10 is configured to include camera device CA, microphone array device MA, directivity control device 30, lighting device 50, and recorder 60. Camera device CA, microphone array device MA, directivity control device 30, lighting device 50 and recorder 60 are connected to each other via network NW such that a data communication can be performed. Network NW may be a wired network (for example, an intranet or the Internet) or may be a wireless network (for example, a wireless local area network (LAN)).

In addition, microphone array device MA, camera device CA and lighting device 50 are installed in an imaging target area (for example, monitoring area 9) in a store, warehouse, a factory, or the like. On the other hand, directivity control device 30 and recorder 60 are installed in an office or a waiting room (for example, monitoring room 8) corresponding to a backyard of monitoring area 9.

Camera device CA as an example of a capture is a pan-tilt-zoom (PTZ) camera which can freely move to the panning direction, move to the tilting direction, and perform zooming processing, is installed on a flat surface such as a wall or a ceiling in the room, and functions as a monitor camera that can image in an arbitrary direction of monitoring area 9 where the device itself is installed.

Camera device CA may be an omnidirectional camera which can image a state around monitoring area 9 as an omnidirectional image (that is, an image having directions of 360°). In a case where camera device CA is an omnidirectional camera, as an example of the omnidirectional image, camera device CA may generate circle-shaped omnidirectional image data in which all the direction around monitoring area 9 is projected, or may perform two-dimensional panorama conversion processing on the circle-shaped omnidirectional image data and generate panorama image data.

In addition, camera device CA may be configured not in one camera, but in a plurality of fixed cameras of which the angles of view which are different from each other are fixedly set. In a case where camera device CA is a plurality of fixed camera, any one fixed camera can be arbitrarily selected from the plurality of fixed cameras by the user (for example, a monitoring person) operating directivity control device 30.

Figure 15:
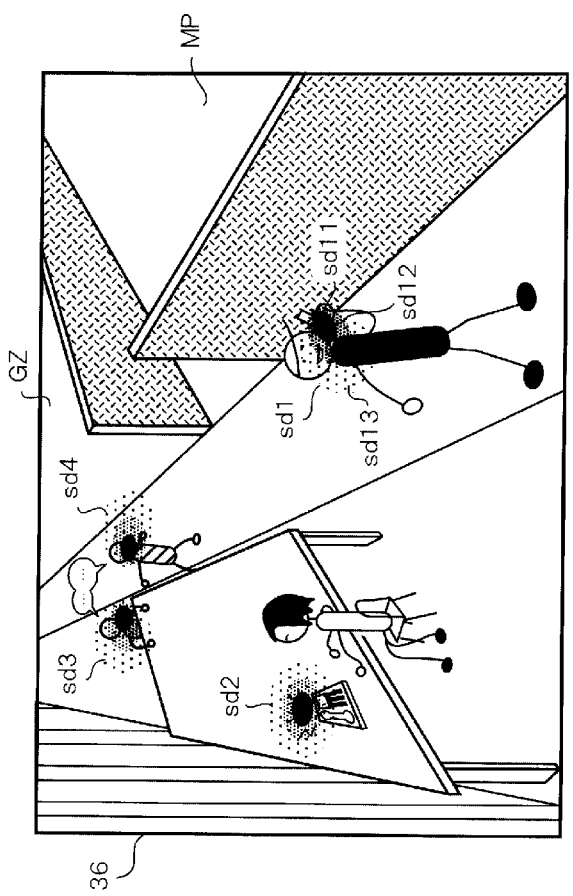
FIG. 15 is a diagram illustrating an example of a voice heat map image in which various sound source direction images are superimposed on capture image data of the monitoring area according to the second embodiment.

Camera device CA stores a time when the image is captured (that is, an imaging time) in association with the image data and transmits the image data including the imaging time data to directivity control device 30 via network NW. Hereinafter, the image obtained by imaging monitoring area 9 using camera device CA (for example, any fixed camera selected from the PTZ camera, the omnidirectional camera, or a plurality of fixed cameras) will be referred to as "capture image". Therefore, according to the present embodiment, as illustrated in FIG. 15 and will be described below in detail, capture image GZ and voice heat map image MP in which capture image GZ and various sound source direction images sd1, sd2, sd3, and sd4 are superimposed are distinguished as different data items.

Microphone array device MA as an example of a sound collector is installed on a flat surface such as a ceiling in the room and non-directionally collects the voices of all the direction around monitoring area 9 where the device itself is installed. Microphone array device MA includes a housing in which an opening is formed at the center thereof, and further includes a plurality of microphone units concentrically arrayed along the circumferential direction around the opening. Each of the microphone units are arrayed at equal intervals. For example, a high sound quality and small type electret condenser microphone (ECM) is used as the microphone unit (hereafter, simply referred to as a microphone).

Microphone array device MA stores the voice data obtained by collecting the sound in association with a time when the sound is collected (that is, a sound collection time), and transmits the voice data including the sound collection time data to directivity control device 30 via network NW.

In addition, in monitoring control system 10, in a case where camera device CA is an omnidirectional camera, camera device CA and microphone array device MA may be coaxially disposed. In this way, since an optical axis of omnidirectional camera CA and a central axis of the housing of microphone array MA are coincident, the coordinates system of an image capturable region of camera device CA and the coordinates system of the sound collectable region of microphone array device MA are substantially the same. In other words, a position of a subject seen from camera device CA and a sound source position seen from microphone array device MA can be expressed on the same coordinates system. Therefore, a correspondence relationship between the position of the subject and the sound source position can be clear. Thus, when forming the directivity of the voice data collected by microphone array device MA as the user designation-based directivity direction (refer to the description below), directivity control device 30 can use the coordinates indicating the direction obtained by camera device CA based on the user's designation as the directivity direction seen from microphone array device MA, and thus, it is possible to easily perform a calculation of the directivity direction. The coordinates indicating the direction obtained by camera device CA based on the user's designation are the coordinates that camera device CA calculates the direction toward the actual position in space corresponding to the coordinates in a case where the position on the screen of monitoring monitor 36 on which the image data captured by camera device CA is designated by the user and directivity control device 30 transmits the coordinate data of the designated position to camera device CA.

Directivity control device 30 is configured to include a stationary personal computer (PC) installed outside (for example, monitoring room 8) of the room (for example, monitoring area 9) where, for example, microphone array device MA and camera device CA are installed. When the position on monitoring monitor 36 where the image data captured by camera device CA is designated by the user (for example, the monitoring person), the directivity control device 30 forms the directivity of the omnidirectional voice non-directionally collected by microphone array device MA to the direction (hereinafter, referred to as directivity direction) from microphone array device MA toward the sound source position corresponding to the position on the designated image data, and then, emphasizes the voice of the directivity direction.

In addition, directivity control device 30 estimates the position of the sound source (hereinafter, referred to as simply "sound source position") in monitoring area 9 based on the voice data collected by microphone array device MA. Directivity control device 30 may be configured to include a communication terminal such as a mobile phone, a tablet terminal, or a smart phone instead of the PC.

Here, a specific configuration of directivity control device 30 will be described. Directivity control device 30 illustrated in FIG. 10 is configured to include communicator 31, operator 32, signal processor 33, monitoring monitor 36, loudspeaker device 37, memory 38, and setting manager 39. Signal processor 33 includes sound source detector 34 and output controller 35. Monitoring monitor 36 is included as a configuration of directivity control device 30. However, as an external display, monitoring monitor 36 may be connected to directivity control device 30 so as to be a separated body from directivity control device 30. Similarly, loudspeaker device 37 is also included as configuration of directivity control device 30. However, as an external loudspeaker, loudspeaker device 37 may be connected to directivity control device 30 so as to be a separated body from directivity control device 30.

Setting manager 39 includes coordinates conversion formula that converts the coordinates indicating the position on the image data designated by the user into the coordinates indicating the directivity direction from microphone array device MA toward the actual sound source position corresponding to the position on the image data designated by the user on monitoring monitor 36 on which the image data of monitoring area 9 captured by camera device CA is displayed. In the coordinates conversion processing, setting manager 39 calculates the coordinates (θMAh, θMAv) indicating the directivity direction from microphone array device MA toward the sound source position corresponding to the position on the image data designated by the user, using the coordinates conversion formula described above. Details of the coordinates calculation processing are disclosed in, for example, in Japanese Patent Unexamined Publication No. 2015-029241. Here, θMAh represents a horizontal angle of the directivity direction from microphone array device MA toward the sound source position, and θMAv represents a vertical angle of the directivity direction from microphone array device MA toward the sound source position. The sound source position is a position of the actual sound source corresponding to the position designated from operator 32 by a user's finger or a stylus pen on the video data displayed on monitoring monitor 36. The coordinates conversion processing described above may be performed by signal processor 33, rather than by setting manager 39.

In addition, setting manager 39 stores and holds threshold values (specifically, a sound source detection threshold value (refer to the description below) used by sound source detector 34, and a first threshold value, a second threshold value, and a third threshold value used by output controller 35 when output controller 35 generates the sound source direction image) which are compared with sound pressure p of each pixel calculated by sound source detector 34 described below, in memory 39z. Here, sound pressure p is used as an example of a sound parameter regarding the sound source, and represents a magnitude or an absolute value of the magnitude of the sound collected by microphone array device MA, and is different from a volume which represents the magnitude of the sound output from loudspeaker device 37. The sound source detection threshold value, the first threshold value, the second threshold value and the third threshold value are values compared with the sound pressure of the voice generated in monitoring area 9, and, for example, are set to arbitrary values determined by the user to be suspicious abnormal sound or warning sound (that is, attention needed sound) while the level relationships of the sound pressure being defined. For example, the first threshold value>the second threshold value>the third threshold value the sound source detection threshold value. Here, the sound source is a sound source in a broad sense including not only the sound source actually outputting the sound but also a place where a sound as a result of propagation from the sound source can be heard. In addition, the number of threshold values set in advance is not limited to three, but may be one, two, or equal to or more than four.

Communicator 31 receives the image data transmitted from camera device CA and the voice data transmitted from microphone array device MA and outputs the data items to signal processor 33. In addition, when designation information (refer to description below) by the operation using the user's finger or a stylus pen is received from operator 32 via signal processor 33, communicator 31 transmits the designation information to camera device CA.

Operator 32 is a user interface (UI) for notifying signal processor 33 of the content of the user's input operation, and is configured to include pointing devices such as a mouse and a keyboard. In addition, operator 32 may be configured to include a touch panel or a touch pad which is arranged corresponding to a screen of monitoring monitor 36, and a touch input operation can be input by the user's finger or a stylus pen. When an arbitrary position on the data of voice heat map image MP (refer to FIG. 6) as an example of the sound source capture image displayed on monitoring monitor 36 is designated by the user, operator 32 acquires the coordinates data indicating the designated position and outputs the data to signal processor 33.

Memory 38 is configured to include, for example, a random access memory (RAM), and functions as a program memory for storing a program regulating the operation of directivity control device 30 and data used at the time of executing the program when directivity control device 30 operates, and as a work memory for temporarily storing and holding the data when directivity control device 30 operates. In addition, memory 38 stores voice heat map image MP.

Signal processor 33 is configured to include a central processing unit (CPU), a micro processing unit (MPU), or a digital signal processor (DSP), and performs control processing that totally manages the overall operation control of each unit of directivity control device 30, data input output processing between other units, data operation (calculation) processing, and data storage processing.

As described above, signal processor 33 may calculate the direction (that is, the directivity direction) from microphone array device MA toward the sound source position corresponding to the position designated by the user on the capture image data based on the coordinates of the position designated by the user on the capture image data captured by camera device CA using the coordinates conversion formula held in setting manager 39. In other words, signal processor 33 calculates the coordinates (θMAh, θMAN) of the directivity direction from the microphone array device MA toward the sound source position corresponding to the position appeared on the coordinates (X, Y) on the capture image data displayed on monitoring monitor 36.

Sound source detector 34 in signal processor 33 calculates the sound pressure for each pixel configuring the capture image data based on information relating to the size of each pixel configuring the capture image data captured by camera device CA and the voice data collected by microphone array device MA. In this way, sound pressure calculator 34 generates sound pressure map data in which the calculated value of the sound pressure is assigned to the corresponding position of the pixel for each pixel configuring the capture image data. The sound pressure map data is data in which the position of each pixel configuring the capture image data and the calculated value of the sound pressure at the position (that is, the pixel) are in association with each other. The description is made that sound pressure calculator 34 generates the sound pressure map data based on the calculated value of the sound pressure of each pixel. However, sound pressure calculator 34 may generate the sound pressure map data using an average value, a maximum value, or a minimum value of the calculated values of the sound pressure for each pixel block form from a predetermined number of pixels (for example, four pixels), without using the calculated value of the sound pressure for each pixel.

In addition, sound source detector 34 as an example of a sound source detector detects a sound source direction of the voice data based on the voice data collected by microphone array device MA. The sound source detection processing in sound source detector 34 is a known technology and the detailed description thereof will be omitted. For example, sound source detector 34 divides monitoring area 9 into a plurality of blocks, forms directivity of the voice to the direction from microphone array device MA toward the each block, and determines whether or not the voice exceeding the predetermined sound source detection threshold value is present in the voice of the directivity-formed direction, and then, estimates the sound source direction in monitoring area 9.

Sound source detector 34 determines whether or not the voice in the detected sound source direction is an abnormal sound or a warning sound based on a suspicious event in monitoring control system 10. The suspicious event includes a scream of an official in monitoring area 9, a forced opening or destruction of a door or a window provided in monitoring area 9, or the like when, for example, a suspicious person enters monitoring area 9. Specifically, sound source detector 34 determines whether or not the sound pressure of the voice in the sound source direction exceeds the predetermined sound source detection threshold value for determining the abnormal sound or a warning sound.

Output controller 35 in signal processor 33 controls the operations of monitoring monitor 36 and loudspeaker device 37, and outputs the capture image data transmitted from camera device CA to monitoring monitor 36 to be displayed, and outputs the voice data transmitted from microphone array device MA to loudspeaker device 37. In addition, output controller 35 may control the operations of turning on and off the lighting of lighting device 50.

In addition, output controller 35 performs the directivity forming processing on the voice data collected by microphone array device MA using the voice data collected by microphone array device MA and the coordinates (θMAh, θMAv) of the directivity direction calculated by signal processor 33 or setting manager 39, and then, performs the processing that emphasizes the voice data of the directivity direction.

In addition, output controller 35 generates the sound source direction image which is based on the comparison result between the calculated value of sound pressure p and the threshold values (specifically, the first threshold value, the second threshold value, and the third threshold value) using the sound pressure map data generated by sound source detector 34. The sound source direction image is an image indicating the presence of the sound source of the abnormal sound or the warning sound according to the comparison result between the calculated value of sound pressure p calculated by sound source detector 34 and the first threshold value, the second threshold value, and the third threshold value. Details of the sound source direction image based on the comparison result between the calculated value of sound pressure p and the first threshold value, the second threshold value, and the third threshold value will be described below with reference to FIG. 6.

Furthermore, output controller 35 generates voice heat map image MP (for example, refer to FIG. 6) in which the generated sound source direction image and the capture image data captured by camera device CA are superimposed, and outputs the data of voice heat map image MP to monitoring monitor 36 to be displayed.

As an example of the voice output, loudspeaker device 37 outputs the voice data collected by microphone array device MA or the voice data collected by microphone array device MA and the directivity of which is formed by signal processor 33. Loudspeaker device 37 may be configured as a device separate from directivity control device 30.

Lighting device 50 is a device that can light a part or all of the predetermined space in monitoring area 9. Lighting device 50 has, for example, a swing mechanism, and when receiving the instruction of a lighting direction from microphone array device MA or directivity control device 30, turns the light lamp toward the lighting direction to start lighting. In addition, lighting device 50 may have a plurality of lighting lamps installed on a plurality of locations in monitoring area 9, and may select a lighting lamp that can light the lighting direction instructed from microphone array device MA or directivity control device 30 to start lighting. In addition, lighting device 50 may be a single lighting lamp that can light the space of the entirety of monitoring area 9, and may light the entirety of imaging area when receiving the lighting instruction from microphone array device MA or directivity control device 30. Furthermore, lighting device 50 may have a dimming function that can adjust an amount of illumination of the lighting in step wise, and may start the lighting by an initial value of the amount of illumination according to the lighting instruction from microphone array device MA or directivity control device 30 and then, may perform the increasing or decreasing the amount of illumination in a case where a next instruction is received. The light of the lighting lamp includes the white lights, LED lights, and the halogen lighting.

Recorder 60 is configured to include a controller (not illustrated) for controlling each processing such as data recording and a recorder (not illustrated) for storing the capture image data captured by camera device CA and the voice data collected by microphone array device MA in association with each other. In addition, the starting or the ending of data recording in recorder 60 is performed according to the instruction from microphone array device MA or directivity control device 30. In addition, recorder 60 may store the data of voice heat map image MP described above.

Figure 11:
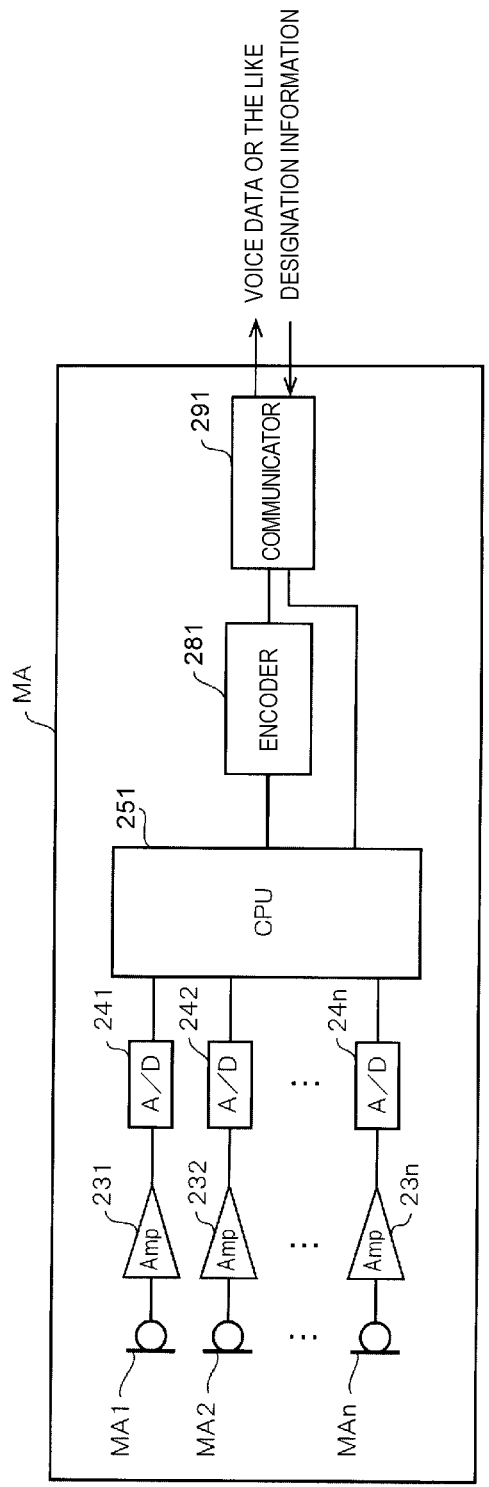
FIG. 11 is a block diagram illustrating an example of an internal configuration of a microphone array device according to the second embodiment in detail.

FIG. 11 is a block diagram illustrating an example of an internal configuration of microphone array device MA according to the present embodiment in detail. Microphone array device MA includes a plurality of microphones MA1, MA2, . . . , MAn, amplifiers 231, 232, . . . , 23n, A/D converters 241, 242, 243, . . . , 24n, CPU 251, encoder 281 and communicator 291.

Amplifiers 231, 232, . . . , 23n amplify the voice signal collected by the plurality of microphones MA1, MA2, . . . , MAn. A/D converters 241, 242, 243, . . . , 24n convert the voice signal respectively amplified by amplifiers 231, 232, . . . , 23n into digital voice data.

CPU 251 performs overall control processing that totally manages the overall operation control of each unit in microphone array device MA, data input output processing between other units, data operation (calculation) processing, and data storage processing. In microphone array device MA, processors such as an MPU or a DSP may be provided instead of CPU 251.

CPU 251 inputs the voice data collected by the plurality of microphones MA1, MA2, . . . , MAn and converted by A/D converters 241, 242, 243, . . . , 24n, and performs voice output processing based on the voice data.

Encoder 281 encodes the voice data output from CPU 251 and generates a voice packet that can be transmitted via network NW. Communicator 291 transmits the voice data encoded by encoder 281 to directivity control device 30 via network NW.

In microphone array device MA, when communicator 291 receives designation information including the coordinates of the sound source direction where the abnormal sound or the warning sound is generated from directivity control device 30, CPU 251 transmits a lighting instruction for lighting device 50 to lighting device 50, and further, transmits an imaging start instruction for camera device CA to camera device CA. Furthermore, after receiving the imaging start instruction for camera device CA from communicator 291, CPU 251 of microphone array device MA transmits a recording start instruction for recorder 60 to recorder 60 from communicator 291 after the imaging direction of camera device CA is adjusted.

In the present embodiment, in a case where camera device CA is configured to include a plurality of fixed cameras, information that any one fixed camera is selected by directivity control device 30 according to the operation of the user (for example, monitoring person) is included in the designation information described above, and in this case, microphone array device MA transmits the imaging start instruction to the fixed camera selected by directivity control device 30. In this way, even in a case where camera device CA is configured to include, for example, a plurality of existing fixed cameras not an omnidirectional camera nor a PTZ camera, microphone array device MA can cause the optimal fixed camera selected by the user (for example, monitoring person) to appropriately image the situation in monitoring area 9 after the generation of the abnormal sound or the warning sound.

In the present embodiment, directivity control device 30 determines whether or not the voice collected by microphone array device MA is the abnormal sound or the warning sound, and further, estimates the sound source direction of the abnormal sound or the warning sound. However, microphone array device MA may determine whether or not the abnormal sound is generated and may estimate the sound source position thereof.

Figure 12:
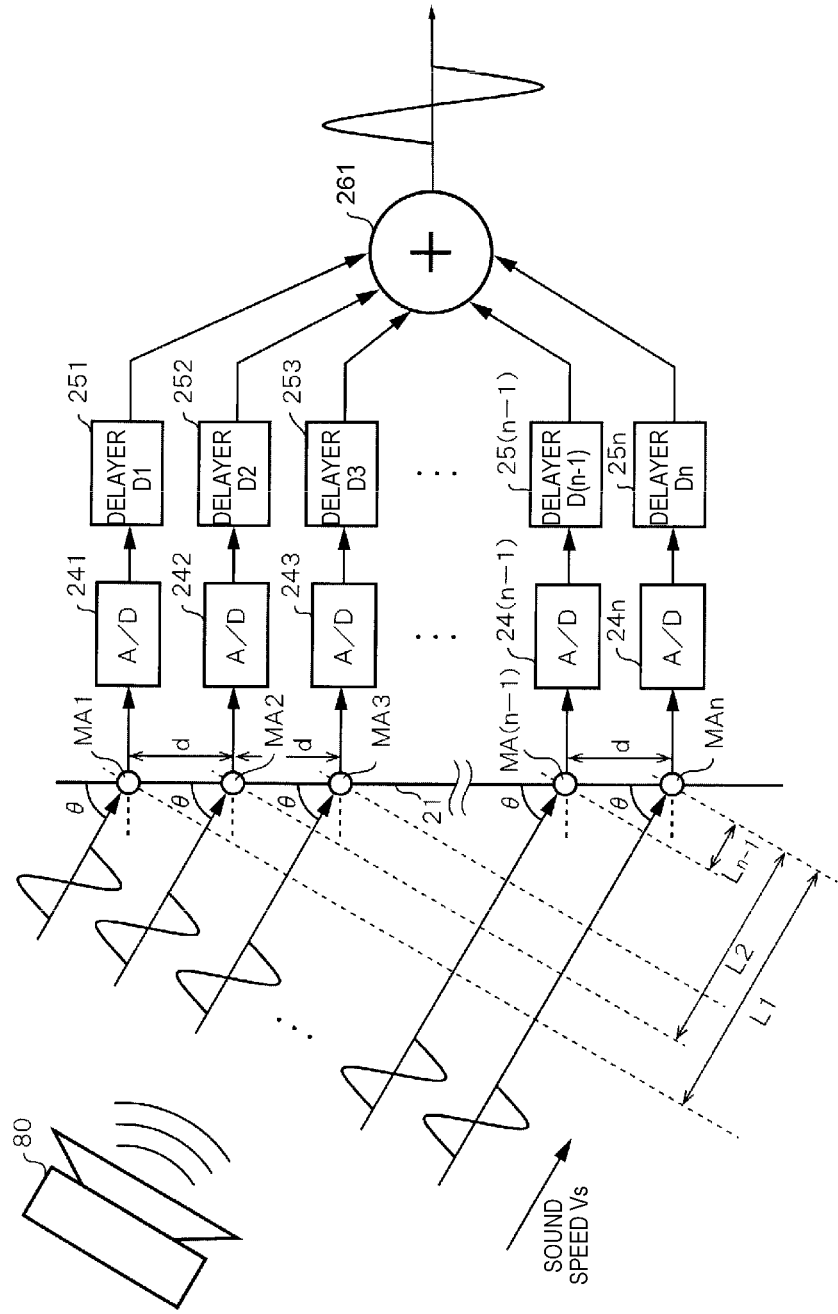
FIG. 12 is an explanatory diagram illustrating an example of a principle of forming directivity of the voice collected by the microphone array device in a specific direction according to the second embodiment.

FIG. 12 is an explanatory diagram illustrating an example of a principle of forming directivity of the voice collected by microphone array device MA in a specific direction according to the present embodiment. Directivity control device 30 sums each voice data collected by each of microphones MA1 to MAn in the voice data directivity control processing using the voice data transmitted from microphone array device MA, and then, generates voice data in which the directivity in the specific direction is formed, in order to emphasize (amplify) the voice (volume level) to the specific direction from the positions of each microphone MA1 to MAn of microphone array device MA. The specific direction is a direction from microphone array device MA toward the voice position selected by operator 32.

In FIG. 12, in order for making the description be easily understood, the microphones are one-dimensionally arrayed on a straight line. In this case, the directivity is in the two-dimensional space in the surface. In order to form the directivity in three-dimensional space, the microphones may be arrayed in a two-dimensional, and then the similar method of processing may be performed.

Sound waves from sound source 80 are incident on each microphone MA1, MA2, MA3 to MA(n−1), and MAn incorporated in microphone array device MA at a certain angle (angle of incidence=(90−θ0) degree). The angle of incidence θ may be a horizontal angle θMAh or may be a vertical angle θMAv to the directivity direction from the microphone array device MA toward the voice position.

Sound source 80 is, for example, a conversation of persons that are the subject of camera device CA present in the sound collection direction of microphone array device MA, and is present in the direction of predetermined angle θ to the surface of housing 21 of microphone array device MA. In addition, interval d between each microphone MA1, MA2, MA3, . . . , MA(n−1), and MAn is constant.

The sound wave output from sound source 80 initially arrives at microphone MA1 and collected, and next, arrives at microphone MA2 and collected, similarly collected by the microphones one after another, and finally arrives at microphone MAn and collected.

Microphone array device MA performs AD conversion on the analog voice data collected by each microphone MA1, MA2, MA3, . . . , MA(n−1), and MAn into the digital voice data using A/D converters 241, 242, 243 to 24(n−1), and 24n.

Furthermore, microphone array device MA gives delay time corresponding to the difference of arrival time to each microphone MA1, MA2, MA3, . . . , MA(n−1), and MAn using delayers 251, 252, 253 to 25(n−1), and 25n and aligns the phases of all the sound waves, and then, adds the delaying processed voice data using adder 261. In this way, microphone array device MA forms the directivity of the voice data of each microphone MA1, MA2, MA3, . . . , MA(n−1), and MAn in the direction of predetermined angle θ.

As described above, microphone array device MA can simply form the directivity of the collected voice data by changing delay times D1, D2, D3 to Dn−1, and Dn set to delayers 251, 252, 253 to 25(n−1), and 25n.

Figure 13:
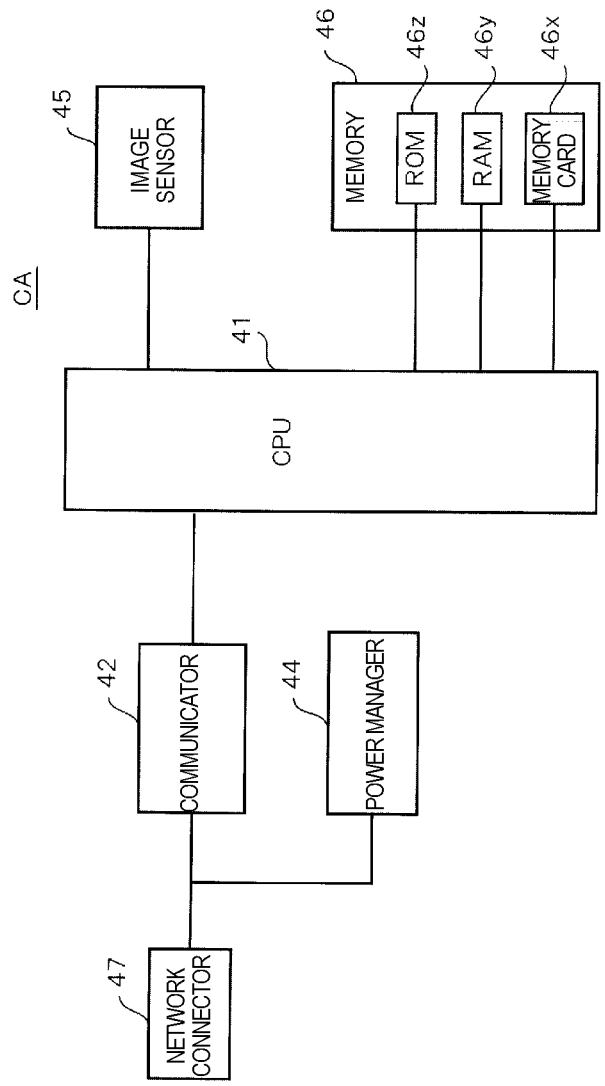
FIG. 13 is a block diagram illustrating an example of an internal configuration of a camera device according to the second embodiment.

FIG. 13 is a block diagram illustrating an example of an internal configuration of camera device CA according to the present embodiment in detail. Camera device CA includes CPU 41, communicator 42, power manager 44, image sensor 45, memory 46 and network connector 47.

CPU 41 performs control processing that totally manages the overall operation control of each unit of camera device CA, data input output processing between other units, data operation (calculation) processing and data storage processing. In camera device CA, processors such as an MPU or a DSP may be provided instead of CPU 41.

Image sensor 45 is configured to include, for example, a complementary metal oxide semiconductor (CMOS) sensor, and acquires the image data by imaging the situation in monitoring area 9. A charge coupled device (CCD) sensor may be used instead of the CMOS sensor.

Memory 46 includes ROM 46z that stores the operation program and the data of the set value, RAM 46y that stores the image data and work data, and memory card 46x that is removably connected to camera device CA and stores various data items.

Communicator 42 is a network interface (I/F) that controls the data communications with network NW connected via network connector 47.

Power manager 44 supplies a DC power to each unit of camera device CA, or supplies a DC power to the devices connected to network NW via network connector 47. Network connector 47 transmits the communication data such as the image data, or is a connector that can supply the power via a network cable.

The monitoring operation in monitoring control system 10 will be described.

Figure 14:
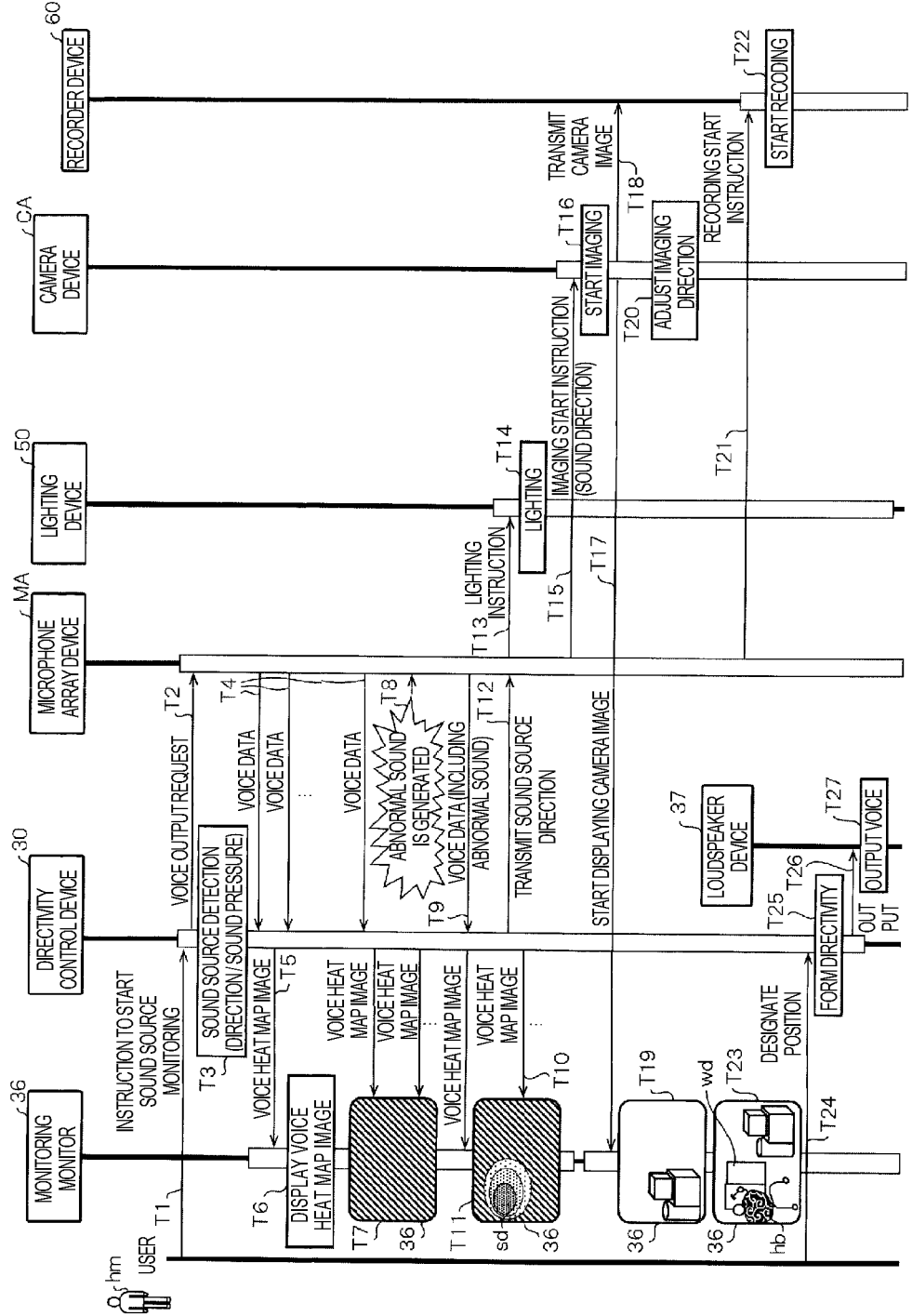
FIG. 14 is a sequence diagram illustrating an example of a monitoring operation procedure in the monitoring control system according to the second embodiment.

FIG. 14 is a sequence diagram illustrating an example of a monitoring operation procedure in monitoring control system 10 according to the present embodiment. In FIG. 5, firstly, user hm instructs directivity control device 30 to start the sound source monitoring via operator 32 (T1). When the power of directivity control device 30 is turned on and the instruction to start the sound source monitoring is received, signal processor 33 in directivity control device 30 causes the voice output request to microphone array device MA to be transmitted to microphone array device MA from communicator 31 (T2). Subsequent to STEP T2, sound source detector 34 of signal processor 33 starts the sound source detection (T3). This sound source detection processing is an operation for obtaining the direction and the sound pressure of the sound source using, for example, sound source detector 34, and is continuously performed when the voice data is transmitted from microphone array device MA during the time when, for example, the power of directivity control device 30 is ON state.

Microphone array device MA starts the sound collection operation when the power is turned on, and when the voice output request is received from directivity control device 30, repeatedly transmits the voice data to directivity control device 30 (T4).

When the voice data is received from microphone array device MA, sound source detector 34 of signal processor 33 in directivity control device 30 calculates the sound pressure of each pixel configuring the capture image data based on the information relating to the size of each pixel configuring the capture image data captured by camera device CA and voice data collected by microphone array device MA. In addition, sound source detector 34 generates sound pressure map data in which the calculated value of the sound pressure is assigned to the corresponding position of the pixel for each pixel configuring the capture image data. Output controller 35 generates the sound source direction image which is based on the comparison result between the calculated value of sound pressure p and the threshold values (specifically, the first threshold value, the second threshold value, and the third threshold value) using the sound pressure map data. Output controller 35 generates voice heat map image MP (for example, refer to FIG. 6) in which the generated sound source direction image and the capture image data captured by camera device CA are superimposed, and outputs the data of voice heat map image MP to monitoring monitor 36 to be displayed (T5).

When the data of the voice heat map image is input, monitoring monitor 36 displays the data of voice heat map image MP (T6). In STEPs subsequent to STEP T6, since the data of the voice heat map image output from directivity control device 30 in STEP T5 is displayed at any time, the voice heat map image MP is displayed as the time-series video images.

Here, in a case where there is no sound source in the voice map data, which satisfies a predetermined condition (for example, the sound pressure exceeds the sound source detection threshold value), monitoring monitor 36 displays a video that reflects nothing (for example, an image which makes the screen black as it is) (T7). The sound source which satisfies the predetermined condition includes various sound sources such as a sound source that outputs a voice of high or low frequency range and a sound source that outputs a musical tone or a noise, not limited to a sound source of which the sound pressure exceeds the sound source detection threshold value.

An abnormal sound or a warning sound of which the sound pressure exceeds the sound source detection threshold value is generated (T8), microphone array device MA transmits the voice data including the abnormal sound or the warning sound to directivity control device 30 (T9). Directivity control device 30 obtains the direction of the sound source generating the abnormal sound or the warning sound, and outputs the data of voice heat map image MP including the sound source direction image of the abnormal sound to monitoring monitor 36 (T10). Monitoring monitor 36 displays voice heat map image MP in which the sound source direction image that indicates the sound source direction seen from microphone array device MA and sound pressure value of the sound source generating the abnormal sound or the warning sound is drawn in a display pattern different from another direction seen from microphone array device MA (T11). Voice heat map image MP is generated by output controller 35 of signal processor 33 of directivity control device 30.

In FIG. 14, ellipses having different sizes are drawn in a superimposing manner as sound source direction image sd of the sound source generating the abnormal sound or the warning sound is drawn on the left side of the screen of monitoring monitor 36. Sound pressure of each pixel is compared with three threshold values (the first threshold value>the second threshold value>the third threshold value) for the determination of the abnormal sound or the warning sound. For example, the sound pressure direction image surrounded by the inner most ellipse has a highest value exceeding the first threshold value and is colored in red. In addition, the sound pressure direction image surrounded by the outer most ellipse has a lowest value exceeding the third threshold value but equal to or lower than the second threshold value, and is colored in blue. Here, sound source direction image sd of the sound source generating the abnormal sound is colored in different colors. However, sound source direction image sd can be expressed in another display pattern such as different shapes.

Directivity control device 30 transmits the result of detecting the abnormal sound or the warning sound (that is, information relating to the sound source direction seen from microphone array device MA where the abnormal sound or the warning sound is generated) by the sound source detector 34 to microphone array device MA (T12). When the result of detecting the abnormal sound or the warning sound by sound source detector 34 transmitted from directivity control device 30 is received, microphone array device MA transmits the lighting instruction to lighting device 50 (T13). In the lighting instruction, the information relating to the direction of the sound source generating the abnormal sound or the warning sound seen from microphone array device MA is included. For example, lighting device 50 holds the information indicating the direction of the sound source seen from microphone array device MA and the information indicating which area lighting device 50 may light in association with each other, and thus, it is possible to turn on the light to the area of the direction of the sound source based on the information relating to the direction of the sound source generating the abnormal sound or the warning sound seen from microphone array device MA included in the lighting instruction described above.

When receiving the lighting instruction, lighting device 50 lights the space in monitoring area 9 including the sound source direction of the abnormal sound or the warning sound seen from lighting device 50 (T14). Here, the detection of the sound source direction where the abnormal sound or the warning sound is generated is performed by directivity control device 30. However, for example, microphone array device MA having the same configuration as sound source detector 34 may perform the detection instead of directivity control device 30. In addition, the lighting instruction to lighting device 50 may be performed by directivity control device 30 instead of microphone array device MA.

After performing the lighting instruction to lighting device 50, microphone array device MA transmits the imaging start instruction to camera device CA (T15). That is, microphone array device MA transmits the imaging start instruction to a direction where the sound source direction detected by sound source detector 34 in directivity control device 30 is replaced by the direction seen from camera device CA. The information relating to what direction seen from camera device CA is the direction of the sound source generating the abnormal sound or the warning sound seen from microphone array device MA is included in this imaging start instruction. The processing that the direction of the sound source generating the abnormal sound or the warning sound is converted into the direction seen from camera device CA may be performed by microphone array device MA or may be performed by setting manager 39 or signal processor 33 of directivity control device 30. Here, in a case where camera device CA is the PTZ camera, microphone array device MA instructs camera device CA to perform the panning, tilting, and zooming operation. In a case where camera device CA is configured to include a plurality of fixed cameras, microphone array device MA designates any one of the fixed camera. In addition, in a case where camera device CA is the omnidirectional camera, microphone array device MA transmits only the imaging start instruction. In this case, camera device CA may perform the panorama conversion on the circle-shaped image (that is, the omnidirectional image including the direction of 360°) captured by the omnidirectional camera according to the cut-out direction included in the imaging start instruction, and then, may generate the panorama image.

Camera device CA transmits the capture image data to monitoring monitor 36 and instructs to start displaying the capture image data (T17). Then, the image data captured by camera device CA is displayed on monitoring monitor 36. At the same time, camera device CA transmits the capture image data to recorder 60 (T18). Monitoring monitor 36 starts to display the image data captured by camera device CA (T19). In this case, the imaging area is lit by lighting device 50 and thus, the image data in the lit imaging area is projected on the screen of monitoring monitor 36. However, in this stage, since the direction of camera device CA is not adjusted (in other words, the optical axis is not facing the direction of the sound source generating the abnormal sound or the warning sound), a capture image of a direction different from the direction of the sound source generating the abnormal sound is projected on the screen of monitoring monitor 36.

After starting imaging, camera device CA adjusts the imaging direction to the sound source direction instructed from the microphone array device MA or directivity control device 30 (T20).

After elapse of the time it is determined that the imaging direction adjustment is finished, microphone array device MA instructs recorder 60 to start recording (T21). When receiving the recording start instruction, recorder 60 starts operating and start recording (T22). By starting recording after the adjustment of the imaging direction, the image data before the adjustment may not be recorded, and thus, it is possible to record only the effective image data.

When the predetermined time has elapsed after the imaging start instruction is given to camera device CA, microphone array device MA determines that the imaging direction adjustment is finished. However, in a case where there is a response signal (Ack) from camera device CA after waiting the response signal, it may be determined that the imaging direction adjustment is finished.

When camera device CA finishes the imaging direction adjustment, monitoring monitor 36 displays the image data of the sound source direction designated by microphone array device MA (T23). In this stage, the sound source direction of the abnormal sound or the warning sound collected by microphone array device MA and the imaging direction (that is, the optical axis direction) by camera device CA are coincident with other. On the screen of monitoring monitor 36, image data in which suspicious person hb is trying to break window wd is projected in the sound source direction where the abnormal sound or the warning sound is generated.

In addition, user hm designates an arbitrary position on monitoring monitor 36 which displays the image data, for example, via operator 32 of directivity control device 30 while viewing the image data displayed on monitoring monitor 36 (T24). In a case where monitoring monitor 36 is configured to have a touch panel, user hm may designate an arbitrary position on the image by directly touching the screen of monitoring monitor 36. Output controller 35 of signal processor 33 in directivity control device 30 forms a voice directivity to a direction (that is, a directivity direction) from microphone array device MA toward the sound source position corresponding to the position designated by user hm (T25), and transmits the voice emphasized in the directivity direction to loudspeaker device 37 (T26). Loudspeaker device 37 outputs the voice which is emphasized by output controller 35 in the directivity direction (T27). In this way, user hm can check the image data at the position where the abnormal sound or the warning sound is generated, and furthermore, can hear the voice in the sound source direction. Therefore, it is possible for user hm to thoroughly perform the monitoring using monitoring control system 10 according to the present embodiment.

FIG. 15 is a diagram illustrating an example of voice heat map image MP in which various sound source direction images sd1, sd2, sd3, and sd4 are superimposed on the data of capture image GZ in monitoring area 9. In FIG. 6, the sound source direction images from total four positions are illustrated. However, there may be only one sound source direction image. In addition, in FIG. 15, an example of voice heat map image MP displayed on monitoring monitor 36 at the time point of STEP T23 illustrated in FIG. 14 is displayed. However, voice heat map image MP illustrated in FIG. 15 is not limited to the image at the time point of STEP T23. For example, voice heat map image MP may be a voice heat map image of a situation in which the area of each sound source direction detected at the time point when each abnormal sound or the warning sound illustrated in FIG. 15 is generated has been already lit by lighting device 50.

In FIG. 15, sound source direction images sd1, sd2, sd3, and sd4 determined to be abnormal sounds at four positions are drawn in voice heat map image MP. Each of sound source direction images sd1, sd2, sd3, and sd4 are generated by output controller 35 of signal processor 33 in directivity control device 30. In sound source direction image sd1, a voice of a person in the passage speaking using a mobile phone is drawn as a sound source. In sound source direction image sd2, a sound of a fixed telephone placed on a desk ringing is drawn as a sound source. In source direction images sd3 and sd4, voices of conversations of two persons are drawn as sound sources.

Sound pressure p of these sound source directions are compared with three threshold values (the first threshold value>the second threshold value>the third threshold value) by output controller 35 described above, and the sound source direction images corresponding to each result of comparison are generated to be displayed in circle shapes. For example, in sound source direction image sd1, output controller 35 generates sound source direction image sd11 in which the calculated value of sound pressure p exceeds the first threshold value while drawing the image in red (display in dark dots). Output controller 35 generates sound source direction image sd12 in which the calculated value of sound pressure p is equal to or lower than the first threshold value and exceeds the second threshold value while drawing the image in yellow (display in normal dots). Output controller 35 generates sound source direction image sd13 in which the calculated value of sound pressure p is equal to or lower than the second threshold value and exceeds the third threshold value while drawing the image in blue (display in thin dots). The sound source direction image in which the calculated value of sound pressure p is equal to or lower than the third threshold value is not particularly drawn remaining transparency as it is, but may be drawn in a specific color. In this case, it can be explicitly understood that the sound pressure is low. In addition, the sound source direction image may be expressed in other colors, patterns, shadings, or the like.

In addition, for example, when any one of sound source direction images sd1 to sd4 determined to be the abnormal sound and displayed on the screen of monitoring monitor 36 is designated by an operation of touching the panel, the voice in that sound source direction is output from loudspeaker device 37. In this way, it is possible for user hm to hear the voice determined to be the abnormal sound or the warning sound in the nervous sound source direction, and to thoroughly perform the monitoring while viewing the image on monitoring area 9. As described above, in monitoring control system 10 according to the present embodiment, camera device CA images the situation in monitoring area 9 as an example of the imaging target area, and microphone array device MA collects the voices in monitoring area 9. Monitoring monitor 36 displays the image data (video data) captured by camera device CA. Sound source detector 34 in directivity control device 30 detects the sound source direction of the voice collected by microphone array device MA. Output controller 35 in directivity control device 30 generates the sound source direction image illustrating the sound source direction of the abnormal sound or the warning sound detected by sound source detector 34. In a case where sound pressure p of the voice collected by microphone array device MA exceeds the threshold value (that is, sound source detection threshold value), lighting device 50 lights the area in the sound source direction where the abnormal sound or the warning sound is generated among monitoring area 9 according to the instruction from microphone array device MA or directivity control device 30. Monitoring monitor 36 displays the sound source direction image generated by output controller 35 so as to be superimposed on the image (capture image) captured by camera device CA.

In this way, even in a case where monitoring area 9 is a dim place or a suspicious abnormal sound or a warning sound is generated at night, if sound pressure p calculated by sound source detector 34 exceeds at least one of the first threshold value to the third threshold value, monitoring control system 10 images the situation in monitoring area 9 using camera device CA after lighting device 50 lights monitoring area 9. Therefore, it is possible to make user hm (for example, the monitoring person) easily recognize and determine what the suspicious abnormal sound or the warning sound generated in monitoring area 9 is. In addition, in voice heat map image MP, sound source direction images sd1, sd2, sd3, and sd4 are displayed in a display pattern different from that in another image portion. Therefore, user hm can visually understand the sound source direction easily.

In addition, in monitoring control system 10 according to the present embodiment, the sound source direction images are displayed in a plurality of display patterns which are different from each other according to the signal level (for example, level of the sound pressure) of the abnormal sound or the warning sound. Here, sound source direction image sd11 in which the sound pressure exceeds the first threshold value is drawn in red. Sound source direction image sd12 in which the sound pressure is equal to or lower than the first threshold value and exceeds the second threshold value is drawn in yellow. Sound source direction image sd13 in which the sound pressure is equal to or lower than the second threshold value and exceeds the third threshold value is drawn in blue. Therefore, the level of the sound pressure generated from the sound source can roughly be understood. In this way, many information items relating to the sound source can be obtained.

In addition, in monitoring control system 10 according to the present embodiment, in a case where it is determined that the abnormal sound or the warning sound is generated, directivity control device 30 records the image data in which the area of the sound source direction of the abnormal image is captured, in recorder 60. In this way, in a case where the abnormal sound or the warning sound is generated, user hm can easily perform the operation of checking the sound source later where the abnormal sound or the warning sound is generated, and thus, it is possible to improve the efficiency of the monitoring business. In addition, in monitoring control system 10 according to the present embodiment, when sound source direction image sd displayed on monitoring monitor 36 is designated by the operation of user hm, directivity control device 30 converts the sound source direction indicated in sound source direction image sd into the coordinates (θMAh, θMAv) indicating the directivity direction from microphone array device MA (that is, the direction from microphone array device MA toward the actual sound source position corresponding to sound source direction image sd), and forms the directivity of the voice using the coordinates after the conversion processing, and then outputs the voice. In this way, user hm can hear the voice generated from the sound source to be focused. In this way, it is possible to thoroughly perform the monitoring.

In addition, in monitoring control system 10 according to the present embodiment, in a case where a plurality of abnormal sounds or the warning sounds is generated among the voices collected by microphone array device MA, output controller 35 of directivity control device 30 generates sound source direction images sd1, sd2, sd3, and sd4 different from each other for each abnormal sounds or the warning sounds. Monitoring monitor 36 displays sound source direction images sd1, sd2, sd3, and sd4 different from each other so as to be superimposed on the capture image captured by camera device CA. In this way, even in a case where a plurality of abnormal sounds or the warning sounds is generated in monitoring area 9, since sound source direction images sd1, sd2, sd3, and sd4 different from each other are superimposed on the capture image captured by camera device CA, user hm can visually and intuitively grasp the presence or absence of the sound source of the individual abnormal sound or the warning sound among the capture images captured by camera device CA, and thus, it is possible to improve the efficiency of the monitoring business of monitoring area 9.

As above, the embodiments are described with reference to the drawings. It is needless to say that the present disclosure is not limited to such examples. It is apparent that those skilled in the art can conceive various change examples or modification examples within the scope of the aspects of the disclosure, and it is understood that those examples can naturally belong to the technical scope of the present disclosure.

For example, in the embodiment described above, the directivity control device detects the sound source direction, calculates the sound pressure, and determines the abnormal sound of which the sound pressure exceeds the threshold value. However, the microphone array device may prepare those functions described above. In this way, it is possible to reduce the load of processing performed by the directivity control device.

What is claimed is:

1. A monitoring system, comprising:
   a camera;
   a microphone array configured to collect sound in a monitoring area;
   a display; and
   a signal processor configured to
   determine whether or not the sound in the monitoring area exceeds a sound source detection threshold value,
   perform, in response to the sound in the monitoring area exceeding the sound source detection threshold value, a first display operation that
   derives a first sound parameter specifying a first level of a sound in the monitoring area for each predetermined unit of pixels configuring image data of a black screen using first sound data collected by the microphone array,
   generates first sound source image information in which the first sound parameter is converted into different visual information in step wise according to a comparison between the first sound parameter and a first plurality of threshold values relating to the first level of the sound, and
   displays the first sound source image information on the display using first plural indicators and in a superimposed manner for each predetermined unit of pixels configuring the image data of the black screen, wherein the first plural indicators are superimposed on the black screen, and the camera is turned off during the first display operation,
   start, subsequent to the first display operation being performed, imaging of the monitoring area by the camera, trigger subsequent to the first display operation being performed, an adjustment of a position of the camera to be directed at a source of the sound in the monitoring area, and perform, subsequent to the imaging of the monitoring area being started and the adjustment of the position of the camera, a second display operation that derives a second sound parameter specifying a second level of a sound in the monitoring area for each predetermined unit of pixels configuring image data of the monitoring area using second sound data collected by the microphone array, generates second sound source image information in which the second sound parameter is converted into different visual information in step wise according to a comparison between the second sound parameter and a second plurality of threshold values relating to the second level of the sound, and displays the second sound source image information on the display using second plural indicators and in a superimposed manner for each predetermined unit of pixels configuring the image data of the monitoring area, wherein the second plural indicators includes a first indicator that is applied to sound parameters that are within a first range defined by a first threshold value of the second plurality of threshold values, and a second indicator that is applied to sound parameters that are within a second range defined by a second threshold value of the second plurality of threshold values.

2. The monitoring system of claim 1, wherein the first sound parameter and the second sound parameters are sound pressures.

3. The monitoring system of claim 1, further comprising:
a sound output configured to reproduce the second sound data collected by the microphone array, wherein, in a case where the second sound source image information displayed on the display is designated, the signal processor forms directivity to a direction from the microphone array toward a position of the image data of the monitoring area corresponding to the designated sound source image information, and causes the sound output to reproduce the second sound data.

4. The monitoring system of claim 1, wherein the camera and the microphone array are coaxially disposed.

5. A monitoring method in a monitoring system including a camera, a microphone array, a display, and a signal processor, the monitoring method comprising:

collecting, by the microphone array, sound in a monitoring area;

determining, by the signal processor whether or not the sound in the monitoring area exceeds a sound source detection threshold value;

performing, by the signal processor and in response to the sound in the monitoring area exceeding the sound source detection threshold value, a first display operation, which includes deriving a first sound parameter specifying a first level of a sound in the monitoring area for each predetermined unit of pixels configuring image data of a black screen using first sound data collected by the microphone array, and generating first sound source image information in which the first sound parameter is converted into different visual information in step wise according to a comparison between the first sound parameter and a first plurality of threshold values relating to the first level of the sound, and displaying the first sound source image information on the display using first plural indicators and in a superimposed manner for each predetermined unit of pixels configuring the image data of the black screen, wherein the first plural indicators are superimposed on the black screen, and the camera is turned off during the first display operation;

starting by the signal processor and subsequent to the first display operation being performed, imaging of the monitoring area by the camera;

triggering, by the signal processor and subsequent to the first display operation being performed, an adjustment of a position of the camera to be directed at a source of the sound in the monitoring area;

performing, by the signal processor and subsequent to the imaging of the monitoring area being started and the adjustment of the position of the camera, a second display operation, which includes deriving a second sound parameter specifying a second level of a sound in the monitoring area for each predetermined unit of pixels configuring image data of the monitoring area using second sound data collected by the microphone array, and generating second sound source image information in which the second sound parameter is converted into different visual information in step wise according to a comparison between the second sound parameter and a second plurality of threshold values relating to the second level of the sound, and displaying the second sound source image information on the display using second plural indicators and in a superimposed manner for each predetermined unit of pixels configuring the image data of the monitoring area, wherein the second plural indicators includes a first indicator that is applied to sound parameters that are within a first range defined by a first threshold value of the second plurality of threshold values, and a second indicator that is applied to sound parameters that are within a second range defined by a second threshold value of the second plurality of threshold values.

6. The monitoring system of claim 1 wherein the predetermined unit of pixels configuring the image data of the monitoring area is a pixel block including a plurality of pixels, and the second sound parameter is an average value of sound pressure values corresponding to the plurality of pixels of the pixel block.

7. The monitoring system of claim 1 wherein
the signal processor is configured to receive a designation of one of the predetermined unit of pixels in which the second sound source image information is superimposed, and the signal processor outputs, in response to the designation being received, sound data collected by the microphone array.

8. The monitoring system of claim 1 wherein
the first indicator includes a first color different from a second color included in the second indicator.

9. The monitoring method of claim 5, further comprising:
receiving a designation of one of the predetermined unit of pixels in which the second sound source information is superimposed, and outputting, in response to the designation being received, sound data collected by the microphone array.

10. The monitoring method of claim 5 wherein the first indicator includes a first color different from a second color included in the second indicator.

11. The monitoring system of claim 1, further comprising:
a lighting device,
wherein the signal processor is configured to trigger, subsequent to the first display operation being performed, the lighting device to light the monitoring area.

12. The monitoring system of claim 1, wherein the second display operation is performed subsequent to the monitoring area being lighted by the light device.

13. The monitoring system of claim 1, wherein the adjustment of the position of the camera moves the camera from an initial position, the camera being directed away from the source of the sound in the monitoring area in the initial position.

14. The monitoring system of claim 13 wherein the display displays an image captured by the camera in the initial position prior to the second sound source image information being displayed.

15. The monitoring system of claim 1, wherein the signal processor is configured to trigger, subsequent to the imaging of the monitoring area being started and the adjustment of the position of the camera, recording of the image data of the monitoring area.

16. The monitoring system of claim 15, wherein the signal processor triggers the recording of the image data of the monitoring area after a predetermined amount of time has elapsed from the adjustment of the position of the camera.

\* \* \* \* \*